(12) United States Patent
Daniels

(10) Patent No.: US 9,958,353 B2
(45) Date of Patent: May 1, 2018

(54) APPARATUS AND METHOD FOR QUANTIFYING FLUID LOSS IN A CLOSED SYSTEM

(71) Applicant: Christopher Daniels, Akron, OH (US)

(72) Inventor: Christopher Daniels, Akron, OH (US)

(73) Assignee: The University of Akron, Akron ( * ) Notice: Subject to any disclaimer, the term of this patent is extended or adjusted under 35 U.S.C. 154(b) by 45 days.

(21) Appl. No.: 15/013,212

(22) Filed: Feb. 2, 2016

(65) Prior Publication Data

US 2016/0223426 A1 Aug. 4, 2016

Related U.S. Application Data

(60) Provisional application No. 62/110,632, filed on Feb. 2, 2015.

(51) Int. Cl.
*G01M 3/28* (2006.01)
*F16J 15/32* (2016.01)

(52) U.S. Cl.
CPC ................. *G01M 3/2853* (2013.01)

(58) Field of Classification Search
CPC ........ G01M 3/26; G01M 3/28; G01M 3/2853; F16J 15/02; F16J 15/96; F16J 15/32; F16J 15/06
See application file for complete search history.

(56) References Cited

U.S. PATENT DOCUMENTS 4,715,214 A * 12/1987 Tveter ................. G01M 3/3236
702/51

5,150,605 A * 9/1992 Simpson ............... G01M 3/329
73/49.3

(Continued)

OTHER PUBLICATIONS

Nicholas G. Garafolo and Christopher C. Daniels; The University of Akron, Akron Ohio 44325-3901; USA; An Evaluation of the Compressible Permeation Approach for Elastomeric Space Seals; 12 pages; 50th AIAA Aerospace Sciences Meeting including the New Horizons Forum and Aerospace Exposition Jan. 9-12, 2012, Nashville, Tennessee; AIAA 2012-0802.

(Continued)

*Primary Examiner* — Nguyen Ha
(74) *Attorney, Agent, or Firm* — Renner Kenner Greive Bobak Taylor & Weber

(57) ABSTRACT

In various embodiments, the present invention provides an improved apparatus and method for quantification of fluid loss from a nominally closed system using a pressure decay with mass point leak rate analysis methodology, which avoids the need for repetitive testing due to test configuration incompatibilities and allows for real time analysis and test control based upon desired results. The novel apparatus and methods of the present invention utilize a control system to maintain a desired pressure differential across the test article throughout the test by automatically raising or lowering the downstream pressure as the fluid leaks through the test article. In various embodiments, the apparatus and method of the present invention improves the efficiency of existing test methods by shortening otherwise long test durations, right-sizing the amount of data collected, providing quantifiable and controllable measurement uncertainty, reducing statistical variance, and eliminating post-process data analysis.

24 Claims, 9 Drawing Sheets

(56) References Cited

U.S. PATENT DOCUMENTS

| | | | | |
|---|---|---|---|---|
| 5,540,083 | A | * | 7/1996 | Sato .................... G01M 3/2876 73/40 |
| 7,707,871 | B2 | * | 5/2010 | Lukens ................. G01M 3/229 73/40.7 |
| 2007/0144524 | A1 | * | 6/2007 | Martin ................. A62B 18/025 128/206.12 |
| 2011/0126472 | A1 | * | 6/2011 | Harrison ................. B64G 1/22 49/477.1 |

OTHER PUBLICATIONS

Patrick H. Dunlap, Jr., et al.; Full-Scale System for Quantifying Leakage of Docking System Seals for Space Applications; 25 Pages; 43rd AIAA/ASME/SAE/ASEE Joint Propulsion Conference & Exhibit 8—Jul. 11, 2007, Cincinnati, OH; AIAA 2007-5742; American Institute of Aeronautics and Astronautics.

Patrick H. Dunlap, Jr., et al; Pressure Decay Testing Methodology for Quantifying Leak Rates of Full-Scale Docking System Seals; 14 Pages; 45th AIAA/ASME/SAE/ASEE Joint Propulsion Conference & Exhibit 2—Aug. 5, 2009, Denver, Colorado; AIAA 2009-5319; American Institute of Aeronautics and Astronautics.

Patrick H. Dunlap, Jr., et al; Full-Scale System for Quantifying Loads and Leak Rates of Seals for Space Applications; 20 Pages; 46th AIAA/ASME/SAE/ASEE Joint Propulsion Conference & Exhibit Jul. 25-28, 2010, Nashville, TN; AIAA 2010-6987; American Institute of Aeronautics and Astronautics.

Charles N. Sherlock, Willis Texas; Pressure Change and Flow Rate Techniques for Determining Leakage Rates; Chapter 5; 62 Pages.

Christopher C. Daniels, et al.; Comprehesive Mass Point Leak Rate Technique. Part II: Application of Methodology and Variable Influences; American Institute of Aeronautics and Astronautics; 7 Pages.

Patrick H. Dunlap, Jr, et al.; Pressure Decay Testing Methodology for Quantifying Leak Rates of Full-Scale Docking System Seals; 45th AIAA/ASME/SAE/ASEE Joint Propulsion Conference & Exhibit 2—Aug. 5, 2009, Denver, Colorado; AIAA 2009-5319.

Nicholas G. Garafolo, et al.; 2014; Mass Point Leak Rate Technique with Uncertainty Analysis; Research in Nondestructive Evaluation; 25:2, 125-149, DOI: 10.1080/09349847.2013.861953; http://dx.doi org/10.1080/09349847.2013.861953.

* cited by examiner

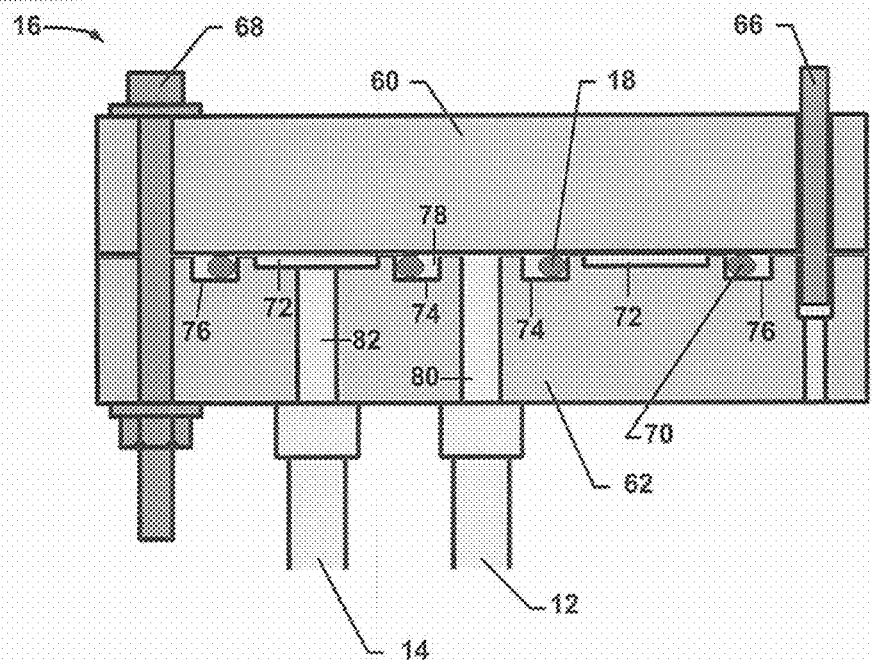
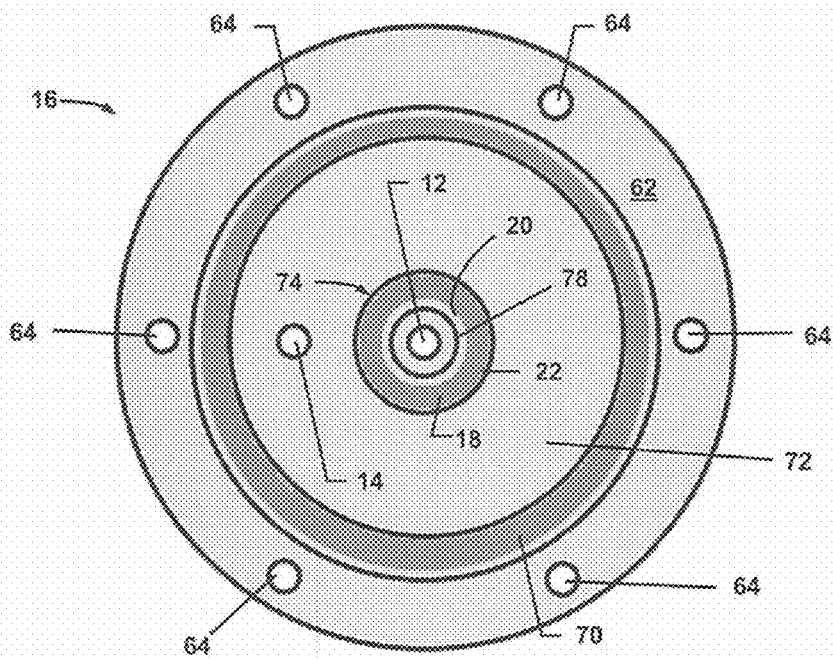

APPARATUS AND METHOD FOR QUANTIFYING FLUID LOSS IN A CLOSED SYSTEM

CROSS REFERENCE TO RELATED APPLICATIONS

This application claims the benefit of U.S. provisional patent application Ser. No. 62/110,632 entitled "Method to Quantify Leak Rates," filed Feb. 2, 2015, and incorporated herein by reference in its entirety.

STATEMENT REGARDING FEDERALLY SPONSORED RESEARCH OR DEVELOPMENT SUPPORT

This invention was made with government support under contract numbers NNC08CA35C and NNC13BA10B awarded by the United States National Aeronautics and Space Administration. The government has certain rights in the invention.

FIELD OF THE INVENTION

One or more embodiments of the present invention relates to an apparatus and method for quantifying the rate of fluid loss from a nominally closed system across a permeable barrier. In certain embodiments, the present invention involves an apparatus and method for quantification of rate of gas loss from a nominally closed system through a test material that avoids repetitive testing due to test configuration incompatibilities and allows for real time analysis and test control based upon desired results.

BACKGROUND OF THE INVENTION

Elastomer gas pressure seals have long been used in a variety of applications including, for example, confining breathing air inside space vehicles. Various silicone compounds are predominantly utilized for these seals because of their temperature performance and reusability. Unfortunately, however, silicone seals have a high relative leak rate due to the permeability of these silicone compounds. The overall leak rate rises even further when the sealing surface is degraded from such things as, for example, on-orbit atomic oxygen impingement, ultraviolet radiation exposure, micrometeoroids and orbital debris impacts, and foreign object debris and lunar dust contamination.

Particularly in aerospace applications, where the leak rate performance of the gas pressure seals dictates the quantity and weight of resources required to replenish breathing air, it is critically important to understand and quantify the leak rate and corresponding mass loss of an escaping gas or gases. For each seal design considered for use in space, for example, lengthy and costly developmental programs are commonly undertaken to quantify the leak rate within the seal's anticipated operational envelope to determine both the conditions of maximum leak rate and the leak rates at common operational conditions. Since multiple tests may be conducted to achieve statistical significance or to reduce experimental uncertainty, large quantities of leak rate tests are often required to achieve meaningful results.

Many methods are known in the art for measuring gas (or other fluid) leak rates of various magnitudes. For gas seals used in space habitat applications, two methods are most typically used, depending upon the size of the leak and the gas to be measured. The first is a pressure decay method with a mass point leak rate analysis. In this method, the test apparatus consists of a volume of gas or other fluid that is hermetically sealed except for the article being tested (referred to herein as a "nominally closed system"). The apparatus is pressurized with an ideal gas until the pressure is slightly above a desired differential pressure (see, FIGS. 1A-B), which is then allowed to leak from a high pressure side through the test article to a low pressure side. The gas pressure and temperature are recorded over time as the gas leaks through the testing article, causing the pressure upstream of the test article to decrease. The reduction in the high-side pressure continues until the desired pressure differential is achieved. The leakage is allowed to continue for some underdetermined internal pressure loss beyond the target differential pressure. The mass of gas within the system is calculated using a thermodynamic equation of state such as the ideal gas law. The mass of the gas is then calculated at an arbitrary number of time-steps yielding a mass-time data set $(t_i, m_i)$. A best-fit line to the data is computed using a linear least-squares regression centered about the differential pressure of interest. The first-order coefficient of the best-fit line represents the leak rate of the test article.

The pressure decay method with mass point leak rate analysis may be applied to a wide range of leak rates, and a reasonable measurement uncertainty can be achieved. The method utilizes low cost equipment, mainly temperature and pressure measurement devices, and any ideal gas, fluid/ideal gas mixture, or compressible liquid of interest may be characterized. This is important because different gases leak at different rates through similar size and configuration leakage paths.

Prior art mass point leak rate methods generally utilize one of two downstream pressure configurations. In one configuration, atmospheric laboratory pressure conditions are downstream of the test article. (See e.g., FIG. 1A). As such the downstream barometric pressure is variable or quasi-static depending upon the duration of the test and the weather conditions. The second typical configuration is similar to the first but utilizes a constant downstream pressure, typically vacuum pressure provided by a vacuum pump. (See e.g., FIG. 1B) To achieve this downstream pressure, another seal is installed to create a region that is capable of confining the vacuum pressure. The difference between these two applications of the traditional mass point leak rate method is minor and the theory and calculations are identical for both.

There are, however, a variety of significant problems with known pressure decay methods with a mass point leak rate analysis. The first major problem with these prior art methods is that to accurately quantify the leak rate of the nominally closed system, the leak rate must be known (or closely estimated) a priori because the internal pressure and internal test section volume influence the pressure decay rate. In general, the system is designed around a desired leak rate at a specified pressure differential, as the leak rate increases with increasing pressure differential. If the magnitude of the leak rate is too great with respect to the design of the rest of the system, the test's differential pressure crosses the target differential pressure too quickly and the amount of usable data surrounding the crossover point is limited. See FIG. 2. Conversely, if the magnitude of the leak rate is too small with respect to the design of the rest of the system, the test differential pressure approaches the target differential pressure very slowly, (see, FIG. 3) and a long time is needed to reach the desired pressure differential.

During this time period, test temperature and/or pressure outside the closed system may vary excessively degrading the data.

To avoid these problems, it is necessary when using the traditional method to know the leak rate of the nominally closed system before the leak rate test is configured and started. The consequences of having to know the test result value before starting the test are twofold. To begin with, the test must be run twice. The first time, a leak rate measurement identifies the leak rate, but is not likely to be of the highest quality. Adjustments are then made to the measurement system and the test is rerun. In addition, any unexpected results generated during the first test are likely attributed to the lower quality of the measurement and may be dismissed. If there are any anomalies that occur during the first test and are not confirmed by the second test, then a third test may be required.

Secondly, with these methods, mass loss and measurement uncertainty cannot be calculated in real time because the test operator must determine which subset of the collected data should be used for mass loss computations. Data is recorded throughout the duration of the test. The test operator determines when the data collection should stop and then which subset of the collected data should be used for mass loss computations. The retained data subset is centered at the pressure differential of interest. The quantity of data that is contained within the retained subset is determined by the operator. It is this step that prohibits the existing method of computing the mass loss and measurement uncertainty in real-time as data collection must be complete before the mass loss and measurement uncertainty may be calculated.

Third, in these prior art methods, the full data set is parsed such that a portion of the data at the beginning of the data and a portion of the data at the end of the data set are discarded. This operation is undesirable as it may involve manipulation and computations on large data sets consuming long time durations, both computationally and for the operator. The discarding of data collected represents inefficiency in this method. While uncommon, at this point the operator may realize that the test was started or ended at inappropriate test conditions resulting in the test being rerun. Fourth, with these prior art methods, each test quantifies only one leak rate. The method cannot quantify leaks that vary with time. Any variation with time is averaged into the test result. Last, while these methods do take temperature into account, the methods remains temperature sensitive. The temperature used in the calculations must accurately represent the gas temperature, which may be challenging to accomplish. Moreover, the duration of the leak test may vary depending upon the combination of test article leak rate and the size of the internal volume.

A second commonly used leak rate quantification method is the helium (or other tracer gas, such as argon or neon) leak detector method. Using this method, the apparatus is pressurized with helium on the interior of the test article. The low-pressure side of the test article is vacuum pressure, typically less than 10 mtorr, and is connected to a mass spectrometer leak detector. The gases that are transported past the test article are electrically charged in the detector. The detector's mass spectrometer associates the abundance of tracer gas ions with a volumetric flow rate. The tracer gas method's main advantage is that the leak rate is computed in real-time, but this advantage comes with several significant limitations.

To begin with, the types of gases that may be used as tracer gases are limited, (commonly helium, argon, or neon), with the type of gas affecting the leak rate value. Particularly in aerospace applications involving confining breathing air inside space vehicles, it is desirable to determine the leak rate of air (rather than a tracer or component gas) through the test article. The leak rate for air (or another target gas) may be significantly different than that of the tracer gas. The leak rate from a helium leak detector test is reported in volumetric flow rate of helium which has to be converted to mass flow rate of air for application to space habitat seals; the conversion process is not constant, nor trivial, as it is dependent upon the geometry of the leak paths within the test article. In addition, since the mass spectrometer used to count the number of tracer atoms/molecules that have escaped the closed volume can only function under vacuum conditions, the downstream pressure must be a vacuum pressure. Also, while this test technique has been found to provide excellent results for very small volumetric flow rates, it becomes impractical for large flow rates since the pressure at the mass spectrometer can exceed operational limits when too much tracer gas flows into the leak detector. This impracticality includes situations when the size of the seal becomes too great, as the leak rate increases linearly with seal length for seals of identical geometry and material (e.g., O-rings). Moreover, the tracer gas leak detector method requires expensive equipment and properly trained personnel. Further, while the test duration is not necessarily lengthy, the detector calibration process must be completed during every test trial, extending the length of the test.

Moreover, the measurement uncertainty for these tracer gas methods is difficult to compute, uncontrollable, and may be orders of magnitude higher than that generated using the mass point leak rate techniques described above. The difficulty in computing the uncertainty arises from the fact that it is dependent upon the test setup. It is uncontrollable because the uncertainty is dependent upon the test data and is computed after the conclusion of the test; the test cannot be run such that a defined value of measurement uncertainty is achieved. Due to the relatively poor repeatability and accuracy of the mass spectrometer, the measurement uncertainty can be very large (greater than 100%). As will be apparent, reducing margins of error by utilizing test methods with quantifiable and low measurement uncertainty is important for obtaining statistically significant and useful results and these are features that these tracer gas methods do not provide.

For the reasons set forth above, among others, known leak rate quantification methods have significant drawbacks, particularly when used to develop space seal performance data. What is needed in the art is a leak rate quantification apparatus and method having all of the desired attributes described above, namely the capability to: quantify small and large leak rates, assign a reasonable level of uncertainty, utilize air as the test gas, and maintain short test durations with leak rates and associated uncertainty calculated in real-time, without the drawbacks of current methods.

SUMMARY OF THE INVENTION

In one or more embodiments, the present invention provide an apparatus and method for quantification of fluid loss from a nominally closed system which avoids the need for repetitive testing due to test configuration incompatibilities and allows for real time analysis and test control based upon desired results. The apparatus and method of the various embodiments of the present invention improve the efficiency of an existing test method by shortening otherwise long test durations, right-sizing the amount of data collected (i.e., eliminating wasted data collection at the beginning and end of the test, and eliminating tests terminated prematurely), utilizing low-cost hardware and instrumentation so the tests can be replicated in multiple test stands, providing quantifiable and controllable measurement uncertainty, reducing statistical variance, and eliminating post-process data analysis. Utilizing the novel method in leak rate quantification according to various embodiments of the present invention, reduces project cost and schedule issues, improves test results, and eases interpretation between data sets.

In a first aspect, one or more embodiments of the present invention are directed to an apparatus for determining the rate of fluid loss from a nominally closed system across a test article comprising: a test article having a high pressure side and a low pressure side; a nominally closed system containing a fluid having a first pressure, wherein the nominally closed system is in fluid communication with the high pressure side of the test article; a pressure controlled system having a second pressure, wherein the pressure controlled system is in fluid communication with the low pressure side of the test article, and the second pressure is lower than the first pressure, thereby creating a predetermined pressure differential between the first pressure and the second pressure; a means for controlling the second pressure to maintain the predetermined pressure differential as the fluid is lost from the nominally closed system across the test article. In one or more embodiments, the test article may comprise one or more seal, gasket, O-ring, bottle, chamber, piping, or combinations thereof.

In one or more embodiments, the apparatus for determining the rate of fluid loss of the present invention may include any one or more of the above referenced embodiments of the first aspect of the present invention wherein the nominally closed system comprises: a vessel having a known internal volume; one or more sensors for measuring the temperature of the internal volume of the vessel; one or more transducers for measuring the pressure inside the nominally closed system; and a hermetic valve. In one or more embodiments, the apparatus for determining the rate of fluid loss of the present invention may include any one or more of the above referenced embodiments of the first aspect of the present invention wherein the nominally closed system comprises a pressure regulator, a vent, and/or a vacuum pump.

In one or more embodiments, the apparatus for determining the rate of fluid loss of the present invention may include any one or more of the above referenced embodiments of the first aspect of the present invention wherein the means for controlling the second pressure comprises: a microcontroller programmed to maintain a predetermined pressure differential between the first pressure and the second pressure; a differential pressure transducer operatively connected to both the nominally closed system and the pressure controlled system, the differential pressure transducer providing an output signal to the microcontroller indicative of a measured pressure differential between the first pressure and the second pressure; a pressure regulator in fluid communication with the pressure controlled system, wherein the pressure regulator is operatively connected to and controlled by the microcontroller; and a pump for increasing or decreasing the second pressure; the pump operatively connected to and controlled by the pressure regulator.

In one or more embodiments, the apparatus for determining the rate of fluid loss of the present invention may include any one or more of the above referenced embodiments of the first aspect of the present invention wherein the means for controlling the second pressure comprises: a microcontroller programmed to maintain a predetermined pressure differential between the first pressure and the second pressure; a first pressure sensor 84 for measuring the first pressure, wherein the first pressure sensor is operatively connected to both the nominally closed system and the microcontroller and provides an output signal to the microcontroller indicative of the first pressure; a second pressure sensor 86 for measuring the second pressure, wherein the second pressure sensor is operatively connected to both the pressure controlled system and the microcontroller and provides an output signal to the microcontroller indicative of the second pressure; a pressure regulator in fluid communication with the pressure controlled system, wherein the pressure regulator is operatively connected to and controlled by the microcontroller; and a pump for increasing or decreasing the second pressure; the pump operatively connected to and controlled by the pressure regulator.

In one or more embodiments, the apparatus for determining the rate of fluid loss of the present invention may include any one or more of the above referenced embodiments of the first aspect of the present invention wherein the fluid is a gas. In one or more embodiments, the apparatus for determining the rate of fluid loss of the present invention may include any one or more of the above referenced embodiments of the first aspect of the present invention wherein the fluid comprises a gas selected from the group of ideal gases such as hydrogen, helium, neon, argon, xenon, radon, oxygen, nitrogen, carbon dioxide, and air.

In a second aspect, one or more embodiments of the present invention are directed to a method for determining the rate of fluid loss from a nominally closed system across a test article comprising: providing a test article having a high pressure side and a low pressure side; providing a nominally closed system containing a fluid at a first pressure, wherein the nominally closed system is in fluid communication with the high pressure side of the test article and the nominally closed system is hermetically sealed except for the test article, through which the fluid may leak; providing a pressure controlled system having a second pressure that is lower than the first pressure, wherein the pressure controlled system is in fluid communication with the low pressure side of the test article; measuring and recording the first pressure as fluid leaks from the nominally closed system across the test article; adjusting the second pressure to maintain a predetermined pressure differential between the first pressure and the second pressure as the fluid leaks from the nominally closed system across the test article; and calculating the rate of loss of the fluid from the nominally closed system based upon the rate of change in the first pressure as the fluid leaks from the nominally closed system across the test article.

In some embodiments of the present invention, the fluid may be a gas. In one or more embodiments, the method for determining the rate of fluid loss of the present invention may include any one or more of the above referenced embodiments of the second aspect of the present invention wherein the fluid comprises a gas selected from the group of ideal gases such as hydrogen, helium, neon, argon, xenon, radon, oxygen, nitrogen, carbon dioxide, and air. In one or more embodiments, the method for determining the rate of fluid loss of the present invention may include any one or more of the above referenced embodiments of the second aspect of the present invention wherein the step of measuring is performed using one or more pressure transducers. In one or more embodiments, the method for determining the rate of fluid loss of the present invention may include any one or more of the above referenced embodiments of the second aspect of the present invention wherein the step of recording and the step of calculating are performed using a microcontroller. In one or more embodiments, the method for determining the rate of fluid loss of the present invention may include any one or more of the above referenced embodiments of the second aspect of the present invention wherein the rate of loss of the fluid is calculated continuously or at regular intervals of from about 0.1 second to about 1 hour.

In one or more embodiments, the method for determining the rate of fluid loss of the present invention may include any one or more of the above referenced embodiments of the second aspect of the present invention further comprising: measuring the temperature of the fluid in the nominally closed system; and calculating the measurement uncertainty from the measured temperature and the measured first pressure. In one or more embodiments, the method for determining the rate of fluid loss of the present invention may include any one or more of the above referenced embodiments of the second aspect of the present invention further comprising programming the microcontroller to automatically stop the test when specific predetermined criteria have been reached.

In one or more embodiments, the method for determining the rate of fluid loss of the present invention may include any one or more of the above referenced embodiments of the second aspect of the present invention wherein the specific predetermined criteria comprises a measurement uncertainty value. In one or more embodiments, the method for determining the rate of fluid loss of the present invention may include any one or more of the above referenced embodiments of the second aspect of the present invention further comprising: storing a target pressure differential in a microcontroller; measuring the pressure differential between the first pressure and the second pressure and sending an output signal indicative of the measured pressure differential to the microcontroller; providing a means for adjusting the second pressure that is operatively connected to the microcontroller; comparing the measured pressure differential to the target pressure differential; if the measured pressure differential is different from the target pressure differential, calculating a revised second pressure value that provides the target pressure differential and sending a signal to the means for adjusting the second pressure indicative of the revised second pressure value; and adjusting the second pressure until it equals the revised second pressure value, thereby maintaining the target pressure differential.

In one or more embodiments, the method for determining the rate of fluid loss of the present invention may include any one or more of the above referenced embodiments of the second aspect of the present invention wherein the means for adjusting the second pressure comprises a pressure regulator, a vent, and a vacuum pump. In one or more embodiments, the method for determining the rate of fluid loss of the present invention may include any one or more of the above referenced embodiments of the second aspect of the present invention wherein the step of measuring the pressure differential between the first pressure and the second pressure further comprises: providing a differential pressure transducer that is in fluid communication with both the nominally closed system and the controlled pressure system and in operative communication with the microcontroller; and measuring the pressure differential between the first pressure and the second pressure using the differential pressure transducer.

In one or more embodiments, the method for determining the rate of fluid loss of the present invention may include any one or more of the above referenced embodiments of the second aspect of the present invention wherein the step of measuring the pressure differential between the first pressure and the second pressure further comprises: providing a first pressure sensor that is in fluid communication with the nominally closed system and in operative communication with the microcontroller; providing a second pressure sensor that is in fluid communication with the pressure controlled system and in operative communication with the microcontroller; measuring the first pressure using the first pressure sensor and providing an output signal to the microcontroller indicative of the measured first pressure; measuring the second pressure using the second pressure sensor and providing an output signal to the microcontroller indicative of the measured second pressure; and calculating the measured pressure differential based upon the input signals of the first pressure sensor and the second pressure sensor. In one or more embodiments, the method for determining the rate of fluid loss of the present invention may include any one or more of the above referenced embodiments of the second aspect of the present invention wherein the rate of loss of the fluid is calculated continuously or at regular intervals of from about 0.1 second to about 1 hour.

BRIEF DESCRIPTION OF THE DRAWINGS

For a more complete understanding of the features and advantages of the present invention, reference is now made to the detailed description of the invention along with the accompanying figures in which:

FIG. 5 is a schematic diagram showing a side cross-sectional view of the test section area of an apparatus for determining the rate of fluid loss from a nominally closed system across a test article according to one or more embodiments of the present invention.

FIG. 6 is a schematic diagram showing a top cross-sectional view of the test section area of an apparatus for determining the rate of fluid loss from a nominally closed system across a test article according to one or more embodiments of the present invention.

DETAILED DESCRIPTION OF THE ILLUSTRATIVE EMBODIMENTS

Figure 7:
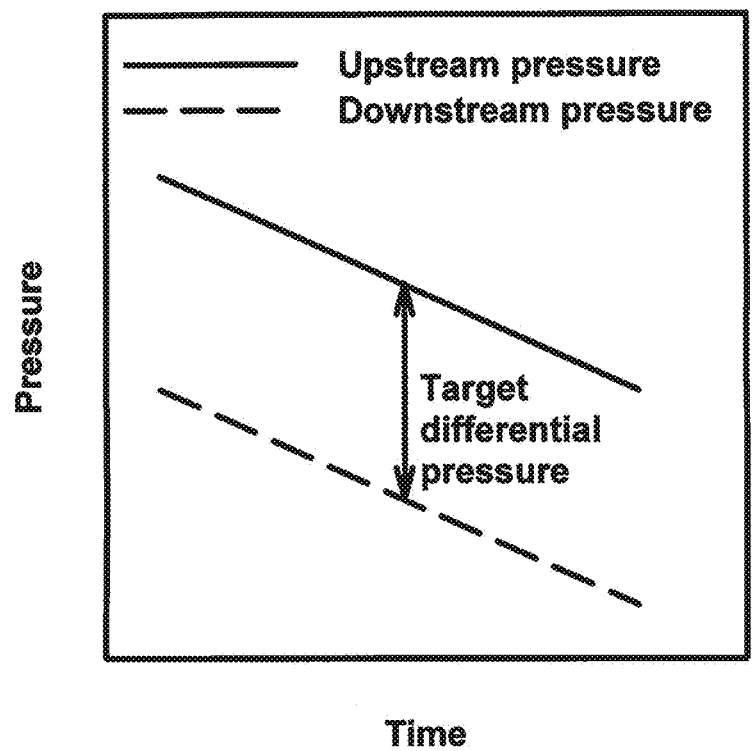
FIG. 7 is a graphic illustration of pressure behavior of the high- and low-pressure sides of a test article in an apparatus for determining the rate of fluid loss from a nominally closed system according to one or more embodiments of the present invention.

In one or more embodiments, the present invention provide an apparatus and method for quantification of fluid loss from a nominally closed system which avoids the need for repetitive testing due to test configuration incompatibilities and allows for real time analysis and test control based upon desired results. In general, the novel apparatus and methods of the present invention are similar to the standard pressure decay method with mass point leak rate analysis, but with one significant enhancement. The novel apparatus and methods of the present invention utilize a control system to maintain a desired pressure differential across the test article throughout the test by raising or lowering the downstream pressure as the fluid leaks through the test article. (See FIG. 7) This enhancement, while seemingly small, substantially and unexpectedly changes and improves the application of the standard pressure decay method with mass point leak rate analysis. And as a result, the apparatus and method of the various embodiments of the present invention improve the efficiency of an existing test method by shortening otherwise long test durations, right-sizing the amount of data collected (i.e., eliminating wasted data collection at the beginning and end of the test, and eliminating tests terminated prematurely), utilizing low-cost hardware and instrumentation so the tests can be replicated in multiple test stands, providing quantifiable and controllable measurement uncertainty, reducing statistical variance, and eliminating post-process data analysis.

Figure 4:
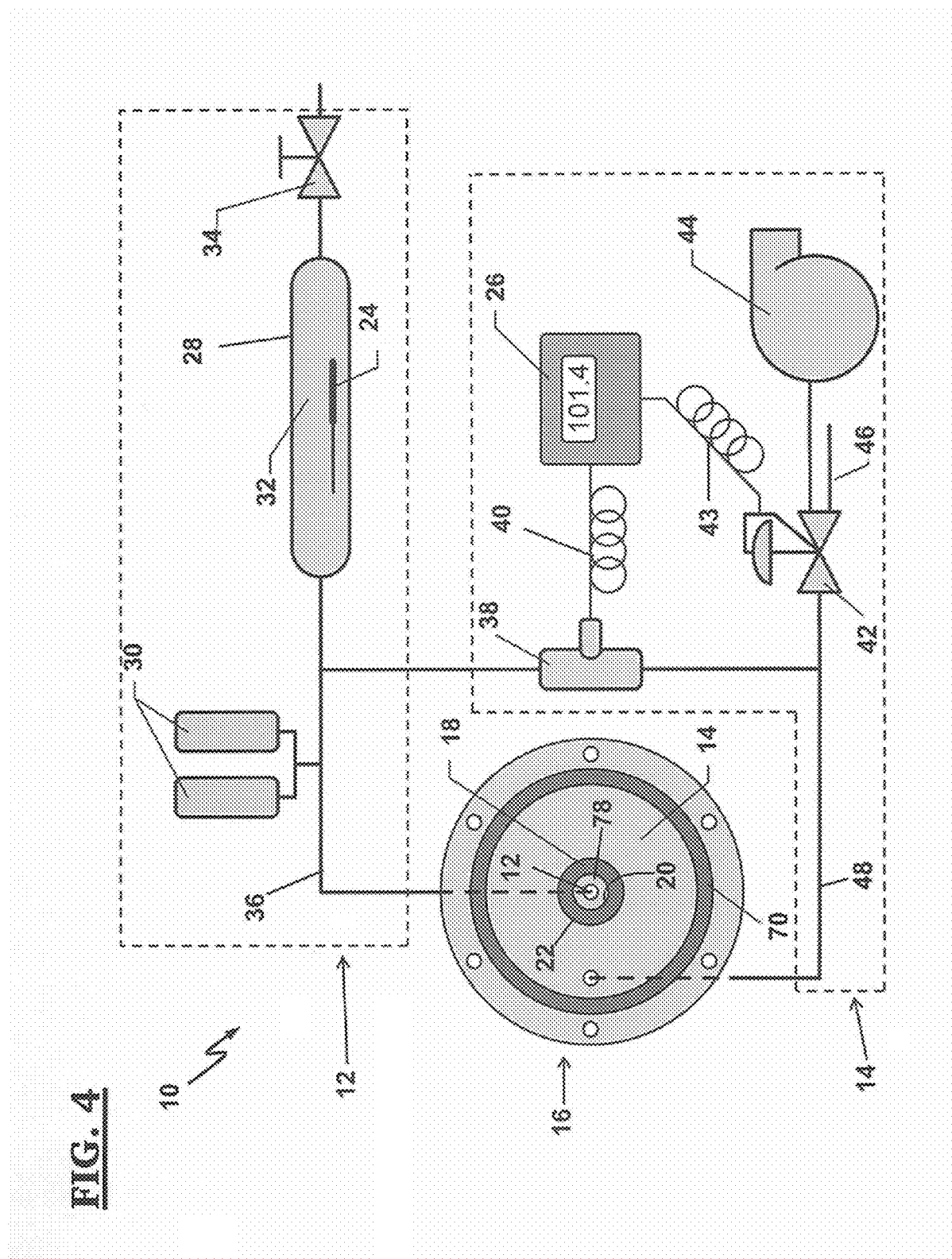
FIG. 4 is a schematic diagram of an apparatus for determining the rate of fluid loss from a nominally closed system across a test article according to one or more embodiments of the present invention.

The pressure decay-type leak rate measurement methods and apparatus of various embodiments of the present invention is highly versatile and can be adapted to quantify mass leak rates for a wide variety of fluids, including any ideal gas, two-phase (fluid/gas) separation, or compressible liquid. Suitable gases may include, without limitation, air, oxygen, nitrogen, argon, helium, hydrogen, and carbon dioxide. Suitable compressible fluids may include, without limitation, ethyl ether, hexane, and heptane. As used herein, the term "two-phase fluid/gas separation" refers to a combination of a fluid and gas within the nominally closed volume wherein the gas remains separate from the fluid and does not dissolve into the fluid. Suitable two-phase fluid/gas separation may include, without limitation, water and air or oil and argon. As used herein, the term "test article" refers to the object or material that is the subject of the leak test and while the test article shown in FIGS. 4-6 is an O-ring, it should be understood that the present invention is not so limited. In one or more embodiments, the pressure decay-type leak rate measurement methods and apparatus of the present invention may be adapted for use with test articles including, without limitation, seals, gaskets, O-rings, bottles, chambers, vessels, piping, hoses, adhesives, space vehicles and combinations thereof.

An exemplary embodiment of a pressure decay-type leak rate measurement apparatus according to one or more embodiments of the present invention is shown in FIG. 4 and identified by the number 10. By way of general outline, it consists of a nominally closed system 12, and a controlled pressure system 14, and a test section 16, which holds the test article 18. In various embodiments of the present invention, a first side 20 of the test article 18 is in fluid communication with the nominally closed system 12, which has been pressurized to a first pressure that is generally higher than the pressure at which the desired leak rate measurements are to be taken, and a second side 22 of the test article 18 is in fluid communication with a controlled pressure system 14, controllably pressurized to a second, lower pressure.

As used herein, the phrase "in fluid communication with," when used in reference to the nominally closed system and pressure controlled system means that the volume of fluid in these systems is free to contact the test article and that the pressure of the fluid at the test article is substantially the same as the pressure elsewhere in that system. Further, the system described above as being hermetically sealed (i.e. closed) except for the test article and in fluid communication with the first side of the test article may be referred to herein as the "nominally closed system" or "closed system," since it would be a "closed" system but for the test article, as the "high pressure system" and/or "high pressure side," since it is the side intended to have a consistently higher pressure than the controlled pressure system connected to the second side of the test article, or as the "upstream side" or "upstream system," since it is "upstream" in terms of the flow of the fluid across the test article. Conversely, the controlled pressure system 18 may be referred to herein as the "low pressure system" and/or "low pressure side," since it is the side intended to have a consistently lower pressure than the nominally closed system 16 connected to the first side 20 of the test article 14, or as the "downstream side" or "downstream system," since it is "downstream" in terms of the flow of the fluid across the test article. The nominally closed system may have a variety of different configurations and may be adapted for the specific material or article being tested.

In order to accurately calculate the mass leak rate and measurement uncertainty, as will be discussed below, the internal volume of the nominally closed system 12 should be known or at least estimated with a relatively high degree of accuracy. Generally speaking, the more accurately the internal volume of the nominally closed system 12 can be determined, the more accurate both the calculated leak rate and measurement uncertainty values will be. As will be apparent below, known inaccuracies in the measurement of the internal volume of the nominally closed system constitute a minimum possible measurement uncertainty value.

The internal volume of nominally closed system 12 may be measured or calculated using any suitable means known in the art and the specific method used will depend on the size and shape of the particular system being measured, including, but not limited to geometric calculations of volume using drawing dimensions, geometric calculations of volume using measured dimensions, experimental measurement using Boyle's law. One of ordinary skill in the art will be able to calculate the internal volume of the nominally closed system without undue experimentation. For the pressure decay-type leak rate measurement apparatus according to the embodiment shown in FIGS. 4-6 and discussed below, for example, the internal volume of the nominally closed system 12 was measured using a bottle of known volume, pressure measurement devices, and Boyle's law. In one or more other embodiments, the internal volume of the nominally closed system 12 may be calculated from geometric measurements of the volume's shape.

According to one or more embodiment of the present invention and as shown in FIG. 4, the nominally closed system 12 includes one or more temperature sensors 24 or other means for measuring the temperature of the internal volume of the nominally closed system and transmitting that information to a controller 26, such as a microcontroller, microprocessor, or computer, for further analysis and processing. In some embodiments, from about 1 to about 36 temperature sensors 24 may be used to measure the temperature of the internal volume of the nominally closed system. In some embodiments, from about 1 to about 36 temperature sensors 24 may be used to measure the temperature of the internal volume of the nominally closed system. In some embodiments, two temperature sensors 24 may be used to measure the temperature of the internal volume of the nominally closed system. In the embodiment shown in FIG. 4, one temperature sensor 24 is used to measure the temperature of the internal volume of the nominally closed system.

The mechanism for measuring the temperature of the internal volume of the nominally closed system 12 is not particularly limited and any suitable temperature sensor 24 of suitable range capable of measuring the temperature inside the nominally closed system 12 and relaying the temperature information to a controller 26 may be used, provided that it is chemically and physically compatible with fluid used and the expected temperatures and pressures of the internal volume of the nominally closed system 12. In some embodiments, temperature sensor 24 may be placed within nominally closed system 12 and can measure the temperature of the fluid within the internal volume of the nominally closed system 12 directly. In some other embodiments, temperature sensor 24 may be placed on the outer surface of a portion of the temperature sensor, and is calibrated to accurately estimate the temperature of the internal volume of the temperature sensor 24 based upon the temperature of the surface of the temperature sensor 24. Suitable types of temperature sensors 24 include, without limitation, thermometers, thermocouples, resistance temperature detectors, thermistors, temperature indicating labels and crayons, and infrared instruments.

The temperature information collected by the one or more temperature sensors 24 may be communicated to the controller 26 by any suitable means. In the embodiment shown in FIGS. 4-6, the temperature sensor 24 is a resistance temperature detector (RTD) located externally adhered to the side of a hermetic vessel 28 and is electrically connected to the controller 26 by one or more electrical wires (not shown). In these embodiments, the temperature data is sent to the controller 26 as a voltage indicative of a particular temperature value. In some other embodiments, the temperature sensor 24 converts the temperature into a digital signal which is transmitted to the controller 26 wirelessly or through an appropriate data transmission cable (not shown). In some embodiments, temperature sensor 24 may be located within the internal volume of nominally closed system 12 and transmit temperature values to controller 26 via electrical wires or data cables that pass through one or more hermetic fittings (not shown) in the wall of the nominally closed system 12. In one or more of these embodiments, the one or more hermetic fittings (not shown) are located in the wall of hermetic vessel 28. In one or more embodiments, temperature sensor 24 may be located either on the surface of hermetic vessel 28 or within the internal volume of nominally closed system 12 and transmits an electronic signal indicative of the measured temperature to controller 26 via a wireless network.

As can be seen in FIG. 4, the nominally closed system 12 should also include one or more transducers 30 or other means for measuring the pressure within the internal volume of the nominally closed system 12 and transmitting that information to controller 26 for further analysis and processing. In some embodiments, from about 1 to about 10 transducers 30 may be used to measure the pressure of the internal volume of the nominally closed system 12. In some embodiments, from about 1 to about 10 transducers 30 may be used to measure the pressure of the internal volume of the nominally closed system 12. In the embodiment shown in FIGS. 4-6, two transducers 30 are used to measure the pressure of the internal volume of the nominally closed system 12.

In embodiments where the fluid used is a gas, the pressure will be the same throughout the volume of the nominally closed system and transducers 30 may measure the pressure anywhere within the internal volume of nominally closed system 12. In embodiments where the fluid is a compressible liquid or gas compressible liquid mixture, however, the pressure may vary within the internal volume of nominally closed system 12. As will be understood by those of ordinary skill in the art, in embodiments where the pressure is not the same throughout the nominally closed system, the pressure measurements must be indicative of the pressure within nominally closed system 12 at the first side of the test article.

The mechanism for measuring the pressure of the internal volume of the nominally closed system 12 is not particularly limited and any suitable transducers 30 or other sensors capable of measuring the pressure inside the nominally closed system 12 and relaying the pressure information to a controller 26 may be used, provided that it is chemically and physically compatible with fluid used and the expected temperatures and pressures of the internal volume of the nominally closed system 12. Suitable types of transducers 30 or other pressure sensors include, without limitation, piezoresistive strain gauge, capacitive, electromagnetic, piezoelectric, optical, potentiometric, resonant, thermal or gas ionization.

The pressure information collected by the one or more transducers 30 or other pressure sensors may be communicated to the controller 26 by any suitable means. In some embodiments, the one or more transducers 30 or other pressure sensors are electrically connected to the controller 26 by electrical wiring (not shown) and the pressure information is sent to the controller 26 as a voltage indicative of a particular pressure value. In some other embodiments, the one or more transducers 30 or other pressure sensors convert the measured pressure into a digital signal which is transmitted to the controller wirelessly or through an appropriate data transmission cable (not shown). In the embodiment shown in FIG. 4, the pressure transducer 30 is in fluid communication with the closed system and transmits an electronic signal to the controller 26 via wired connection (not shown).

As can be seen in the embodiment shown in FIG. 4, the nominally closed system 12 may also include one or more hermetic vessels 28 configured to have an internal volume 32 large enough to hold enough of fluid for the particular test to be conducted. The shape and size of the particular vessel 28 used is not particularly limited, but, as set forth above, vessel 28 should have a known of very closely estimated internal volume 32. Accordingly, the size and shape of the vessel 28, and more particularly its internal volume 32, will preferably be configured as to simplify and improve the accuracy of the determination of its internal volume. In some embodiments, the vessel may be spherical, cylindrical, or a prism in shape.

The hermetic vessel 28 may be made of any non-permeable material that is chemically and physically compatible with the test article, and capable of being pressurized to the pressures required for the tests to be run without stretching, deforming, or rupturing. In some embodiments, hermetic vessel 28 may be made from such things as cast iron, steel, aluminum, titanium, or plastic.

As can be seen in FIG. 4, the nominally closed system 12 according to one or more embodiment of the present invention may also include one or more hermetic valve 34. The hermetic valve 34 is in fluid communication with the nominally closed system 12 and permits fluid to be added or removed from the nominally closed system 12 when opened, but does not allow the fluid to escape when closed. The selection of a hermetic valve 34 is not particularly limited and any valve known in the art that permits fluid to be added or removed from the nominally closed system 12 when opened, but hermetically sealed when closed, provided that it is chemically and physically compatible with fluid used and the expected temperatures and pressures of the internal volume of the nominally closed system 12.

Further, in one or more embodiments, the various parts of the nominally closed system are in fluid communication with each other through pipes and/or hoses 36. The pipes and/or hoses 36 will have an internal diameter and corresponding internal volume as a function of their cross-sectional area (which assuming cross-sectional area of the pipes and/or hoses 36 is a circle, is a function of its diameter), and the length. The preferred internal diameter for pipes and/or hoses 36 will of, course, depend upon the size and type of test article, the fluid being used and pressures involved. In some embodiments, pipes and/or hoses 36 may have an internal diameter of from about 0.125 inch to about 10 feet. In some embodiments, pipes and/or hoses 36 may have an internal diameter of from about 0.125 inch to about 1 foot. In some embodiments, pipes and/or hoses 36 may have an internal diameter of from about 0.5 inch to about 5 inches. In some embodiments, pipes and/or hoses 36 may have an internal diameter of from about 0.125 inch to about 0.5 inch. In some embodiments, pipes and/or hoses 36 may have an internal diameter of from about 0.5 inch to about 1 inch. In some embodiments, pipes and/or hoses 36 may have an internal diameter of from about 1 inch to about 1 foot. In some embodiments, pipes and/or hoses 36 may have an internal diameter of from about 1 foot to about 3 feet. In some embodiments, pipes and/or hoses 36 may have an internal diameter of about 10 feet. In some embodiments, pipes and/or hoses 36 may have an internal diameter of about 1 inch.

The material used for pipes and/or hoses 36 is not particularly limited provided that it is non-permeable to the fluid being tested and does not stretch, deform, or rupture at the temperatures and pressures required for the particular leak tests to be performed. Suitable materials for use in pipes and/or hoses 36 will, of course, depend upon the temperatures and pressures that will be used for the testing and may include, without limitation, cast iron, steel, copper, and plastic. In one or more embodiment, pipes and/or hoses 36 may comprise cast iron pipe, steel pipe, copper pipe, copper tubing, stainless steel tubing, PVC tubing, hydraulic hose, and/or PFTE-lined stainless braided hose.

The pressure decay-type leak rate measurement apparatus of various embodiments of the present invention further comprises controlled pressure system 14 in fluid communication with the second side 22 of the test article 18 that adjusts the pressure on the downstream side of the test article to maintain a desired pressure differential with nominally closed system 12 as the fluid leaks past test article 18 and out of the nominally closed system 12. To do this, the controlled pressure system 14 first measures the pressure differential between itself and controlled pressure system 12. The pressure differential may be measured using any configuration of sensors capable of measuring the differential pressure directly or measuring pressure of the nominally closed system 12 and controlled pressure system 14 and transmitting those pressure values to the controller 26, where they may be compared to calculate the differential pressure.

In embodiments such as the one shown in FIG. 4, controlled pressure system 14 includes a differential pressure transducer 38 of suitable range, which is in fluid communication with both controlled pressure system 14 and the nominally closed system 14 and in electrical or data communication with the controller 26. In one or more embodiments, any suitable differential pressure transducer 38 having the required range may be used, provided that it is physically and chemically compatible with the fluid, temperatures and pressures being used. Suitable pressure ranges will, of course, depend upon the particular tests being run. In some embodiments, a differential pressure transducer 38 having a range of from about 0 to about 10 psid may be used. In some embodiments, a differential pressure transducer 38 having a range of from about 10 to about 50 psid may be used. In some embodiments, a differential pressure transducer 38 having a range of from about 50 to about 200 psid may be used. In some embodiments, a differential pressure transducer 38 having a range of about 2000 psid In some of embodiments, the differential pressure transducer 38 is electrically connected to the controller 26 by electrical wiring 40 and the pressure information is sent to the controller 26 as a voltage indicative of a particular differential pressure value. In some other embodiments, differential pressure transducer 38 converts the measured pressure difference into a digital signal which is transmitted to the controller wirelessly or through an appropriate data transmission cable (not shown).

In some embodiments, controller 26 calculates the pressure differential based upon signals received from the one or more transducers 30 or other pressure sensors described above for monitoring the pressure in the nominally closed system 12 and a signal received from a pressure regulator 42 or a second pressure transducer (not shown), in fluid communication with controlled pressure system 14. In some embodiments, the controller 26 may calculate the pressure differential based upon signals received from an additional set of pressure transducers (not shown), one or more of which is in fluid communication with nominally closed system 12 and one or more of which is in fluid communication with controlled pressure system 14.

As can be seen in FIG. 4, controlled pressure system 14 may further comprise a pressure regulator 42 which is in fluid communication with the second side 22 of test article 18 and controls the pressure within the controlled pressure system 14 based upon control signals received from the controller 26 via the appropriate electrical wires or cables 43. Upon receipt of a command to change the pressure in the controlled pressure system 14 to a new target pressure, pressure regulator 42 will cause fluid to be added or removed from the controlled pressure system 14 until the measured pressure matches the target value received from the controller 26. Most often, the target pressure received the controller 26 will less than the measured pressure in controlled pressure system 14 and pressure regulator 42 will be operably connected to vacuum pump 44 and/or vent 46 for removing fluid from controlled pressure system 14. Based upon input received for controller 26, the pressure regulator 42 will send control signals to vent 44 and/or a pump 46 instructing them to remove/permit the escape of fluid from the controlled pressure system 14 until the target pressure is reached. In some other embodiments, the pressure regulator 42 may be operatively connected to sources of fluid held at various pressures which may be mixed with each other and the fluid in controlled pressure system 14 to arrive at the target pressure set by the controller.

While not ordinarily the case, there may be some situations, such as where there is a significant volume of fluid leaking from the controlled pressure system or there is a significant increase in the temperature of the nominally closed system, where the target pressure sent from the controller could be higher than the measured pressure in the controlled pressure system 14 and it may be necessary for the pressure regulator 42 to increase the pressure to reach it. In some of these embodiments, pressure regulator 42 may be operatively connected to a pump. Upon receipt of a control signal from the controller instructing it to increase the pressure, pressure regulator 42 will send a control signal to the pump instructing it to add additional fluid pressure into the closed pressure system 14 until the new, higher, target pressure is reached. In some other of these embodiments, pressure regulator 42 may be operatively connected to a source of fluid kept at a higher pressure than the pressure of the closed pressure system 14, and may send a control signal to a valve instructing it to open and allow the high pressure fluid to enter the closed pressure system 14 until the target pressure is reached.

As with nominally closed system 12 described above, in one or more embodiments, the various parts of the controlled pressure system 14 are in fluid communication with each other through one or more pipes and/or hoses 48. The pipes and/or hoses 48 will have an internal diameter and corresponding internal volume as a function of their length. The preferred internal diameter for pipes and/or hoses 48 will of, course, depend upon the size and type of test article, the fluid being used and pressures involved. In some embodiments, pipes and/or hoses 48 may have an internal diameter of from about 0.125 inch to about 10 feet. In some embodiments, pipes and/or hoses 48 may have an internal diameter of from about 0.125 inch to about 1 foot. In some embodiments, pipes and/or hoses 48 may have an internal diameter of from about 0.5 inch to about 5 inches. In some embodiments, pipes and/or hoses 48 may have an internal diameter of from about 0.125 inch to about 0.5 inch. In some embodiments, pipes and/or hoses 48 may have an internal diameter of from about 0.5 inch to about 1 inch. In some embodiments, pipes and/or hoses 48 may have an internal diameter of from about 1 inch to about 1 foot. In some embodiments, pipes and/or hoses 48 may have an internal diameter of from about 1 foot to about 3 feet. In some embodiments, pipes and/or hoses 48 may have an internal diameter of about 10 feet. In some embodiments, pipes and/or hoses 48 may have an internal diameter of about 1 inch.

The material used for pipes and/or hoses 48 is not particularly limited provided that it is non-permeable to the fluid being tested and does not stretch, deform, or rupture at the temperatures and pressures required for the particular leak tests to be performed. Suitable materials for use in pipes and/or hoses 48 will, of course, depend upon the temperatures and pressures for the testing that will be used and may include, without limitation, cast iron, steel, copper, plastic, or combinations thereof. In one or more embodiment, pipes and/or hoses 48 may comprise cast iron pipe, steel pipe, copper pipe, copper tubing, stainless steel tubing, PVC tubing, hydraulic hose, PFTE-lined stainless braided hose or combinations thereof.

As set forth above, the pressure decay-type leak rate measurement apparatus of various embodiments of the present invention comprises controller 26. Controller 26 may comprise any one or more microcontroller, microprocessor, computer or combination thereof. As set forth above and shown in FIG. 4, controller 26 is operatively connected to temperature sensors 24 and pressure transducer 30 and receives and records the temperature and pressure of the closed system. It is also operatively connected pressure regulator 42, differential pressure transducer 38 and/or any other sensors used to measure the pressure differential.

In one or more embodiments, controller 26 will be loaded with and configured to run one or more data acquisition software programs. Suitable data acquisition software is commercially available from a wide variety of vendors and may include LabVIEW™ System Design Software (National Instruments, Austin, Tex.) or may be custom written in a suitable computer programming language. As will be appreciated by those of skill in the art, most commercially available data acquisition software packages (like LabVIEW™ System Design Software) are highly customizable and can easily be configured to collect data, make computations, and/or control external hardware, among other things. One of ordinary skill in the art will be able to select and implement suitable data acquisition software programs without undue experimentation.

As set forth above, the pressure decay-type leak rate measurement apparatus of various embodiments of the present invention may comprise test section 16 that secures the test article 18 between nominally closed system 12 and controlled pressure system 14. The particular structure and configuration of the test section 16, will, of course, depend upon the particular fluid and test article 18 being used, but should be impermeable to the fluid used and configured hold the test article 18 in an orientation wherein it forms a seal separating two volumes of fluid, preferably, in the same manner as it would during ordinary use.

For example, the test section 16 shown in FIGS. 4-6 and further described below is configured to hold an O-ring between a first and second platen 60, 62, compressing it in a manner consistent with its ordinary or anticipated use to form a seal (albeit one that will leak) between nominally closed system 12 and controlled pressure system 14. As will be apparent, the nominally closed system 12 is on the high pressure side of and in fluid communication with the first side of the test article and the controlled pressure system 14 is on the low pressure side of and in fluid communication with the second side of the test article.

The first and second platens 60, 62 may be made from any solid material or materials compatible with the test article and non-permeable and non-reactive with respect to the fluid being used for the tests. Suitable materials may include, without limitation, steel, stainless steel, titanium, brass, aluminum, and plastic.

Around the periphery of the first and second platens 60, 62, are a series of openings 64 sized to receive one or more alignment pins 66, which maintain the relative position of the first and second platens 60, 62 to each other, and/or one or more mechanical fasteners 66, which secure the first platen 60 to the second platen 60 causing the test article 18 to form the seal between the two platens 60, 62, and, further, prevents the fluid pressure from widening the gap between the first and second platens 60, 62, breaking or otherwise disturbing the seal formed by the test article 18 while it is being tested. While the mechanical fastener 66 shown in FIG. 5 is a nut and bolt arrangement, the invention is not so limited and any mechanical fastener known in the art may be used.

In the embodiment shown in FIG. 5, a second seal 70 substantially prevents fluid from escaping from the low pressure area 72 of test section 16, so that the pressure in controlled pressure system 14 can be effectively controlled. Further, in these embodiments, the second platen 62 further comprises a first annular groove 74 sized to receive the O-ring test article and a second annular groove 76 sized to receive second seal 70. As will be appreciated by those of skill in the art, the depth of first annular groove 74 and second annular grove 76 is significantly less that the diameter of the test article 18 (an O-ring) and second seal 70, respectively, and are compressed to form seals when the first platen 60 is added and secured to second platen 62. Further, in the embodiment shown in FIGS. 5-6, second platen 62 further comprises a high pressure area 78 adjacent to the first side 20 of test article 18. In these embodiments, high pressure area 78 of second platen 62 is connected to and in fluid communication via opening 80 with nominally closed system 12, and, similarly, low pressure area 72 of second platen 62 is connected to and in fluid communication via opening 82 with controlled pressure system 14.

In embodiments where the test article is an O-ring 18 with the shape of a torus, the test section may comprise two disks 60 and 62 with a rectangular toroidal contoured groove 74 removed from one of the disks. In embodiments where the test article is a thin gasket or adhesive with regular or irregular shape, the test section may comprise two disks wherein the side of the thin gasket or adhesive with regular or irregular shape is in fluid communications with the nominally closed system and the other side in fluid communications with the controlled pressure system as set forth above.

In some other embodiments, leak rates of pressurized items such as bottles, vessels, electronic component may be quantified using the methods of the present invention. In these embodiments, the test article itself functions as nominally closed system 12 and its temperature and pressure are measured using sensors in communication with controller 26, as set forth above, and the controlled pressure system 14 is configured as a hermetic chamber sized to receive the test article and is pressure controlled, as set forth above. In these embodiments, the controller is programmed as described above to maintain a desired pressure differential between the pressure within the test article and the pressure in the hermetic chamber surrounding the test article and, as the fluid leaks from the test article will send control signals adjusting the pressure in the hermetic chamber to maintain the pre-programmed desired pressure differential. Provided that the pressure in the downstream pressurized hermetic chamber (into which the test article leaks) can be controlled with sufficient precision, there is no theoretical limit to the size and shape of the test articles that may be used and in various embodiments, this method may be used for items as small as an electrical relay or items as large as a spacecraft.

In addition, as set forth above, the primary focus of the pressure decay-type leak rate measurement apparatus of various embodiments of the present invention is maintaining a predetermined desired pressure differential across the test article. While, as set forth herein, this can be done by controlling (generally reducing) the downstream pressure, it can also be done by adjusting the temperature, and therefore, the pressure of the fluid in the nominally closed system upstream of the test article. Accordingly, in one or more embodiments, pressure decay-type leak rate measurement apparatus of the present invention may further comprise a means for controlling the temperature of the fluid in the nominally closed system, which is connected to and controlled by controller 26. Suitable mechanisms for controlling the temperature of fluid in the nominally closed system may include without limitation, air, radiant, and conductance heaters empowered by electrical resistance or temperature control fluids. In some other embodiments, the mechanism for controlling the temperature of the fluid in the nominally closed system may be operatively connected to controller by one or more electrical wires or data cables. In some embodiments, the mechanism for controlling the temperature of the fluid in the nominally closed system may be operatively connected to controller via a wireless network, as described above.

Similarly, in some other embodiments, adjustments to the pressure of the controlled pressure system necessary to maintain the predetermined desired pressure differential across the test article may affected indirectly by manipulating the temperature of the controlled pressure system to provide the necessary pressure. Accordingly, in one or more embodiments, pressure decay-type leak rate measurement apparatus of the present invention may further comprise temperature sensor, in communication with controller 26, for measuring the temperature of the internal volume of the controlled pressure system and a means for controlling the temperature of the fluid in the controlled pressure system, which is connected to and controlled by controller 26. Suitable types of temperature sensors 24 include, without limitation, thermometers, thermocouples, resistance temperature detectors, thermistors, temperature indicating labels and crayons, and infrared instruments. Suitable mechanisms for controlling the temperature of fluid in the controlled pressure system may include without limitation, air, radiant, and conductance heaters empowered by electrical resistance or temperature control fluids. In some other embodiments, the temperature sensor and mechanism for controlling the temperature of the fluid in the controlled pressure system may be operatively connected to controller by one or more electrical wires or data cables. In some embodiments, the temperature sensor and mechanism for controlling the temperature of the fluid in the controlled pressure system may be operatively connected to controller via a wireless network, as described above.

In another aspect, the present invention is directed to a novel method of for determining the rate of fluid loss from a nominally closed system across a test article. The novel test method of the present invention is similar to the standard pressure decay method with mass point leak rate analysis, but with one significant enhancement. As set forth above, in the standard pressure decay method with mass point leak rate analysis methods known in the art, the low-pressure region into which the fluid leaks is at a constant or uncontrolled barometric pressure, usually the barometric pressure of the laboratory or a vacuum. As the gas leaks from the high pressure side of the test article to the low pressure side of the test article in these systems, the pressure differential across the set article changes.

Figure 1A:
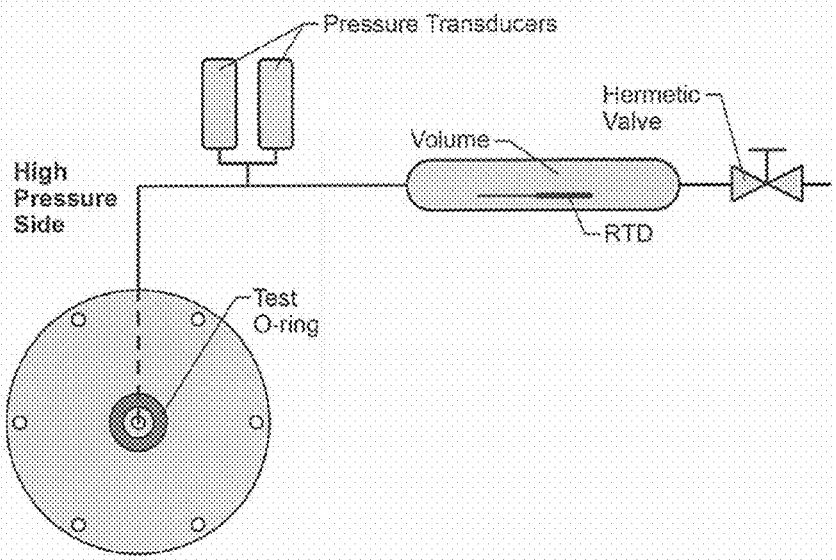
FIGS. 1A-B are schematic diagrams of prior art apparatuses for determining the rate of fluid loss from a nominally closed system using the pressure decay method with a mass point leak rate analysis where the low pressure side is kept at atmospheric pressure (FIG. 1A) and at vacuum pressure (FIG. 1B).
Figure 1B:
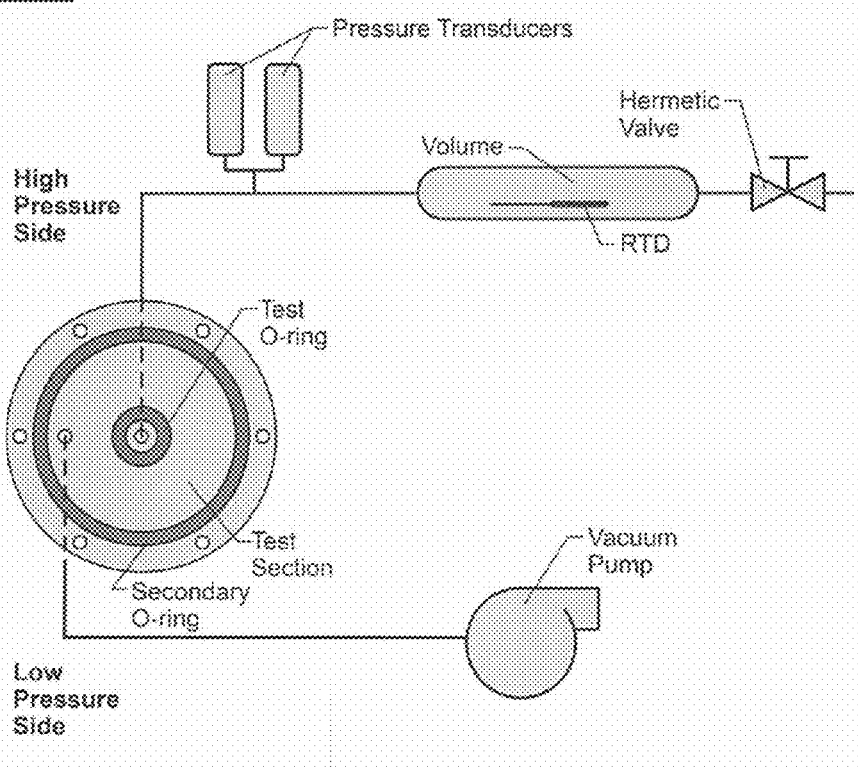
Figure 2:
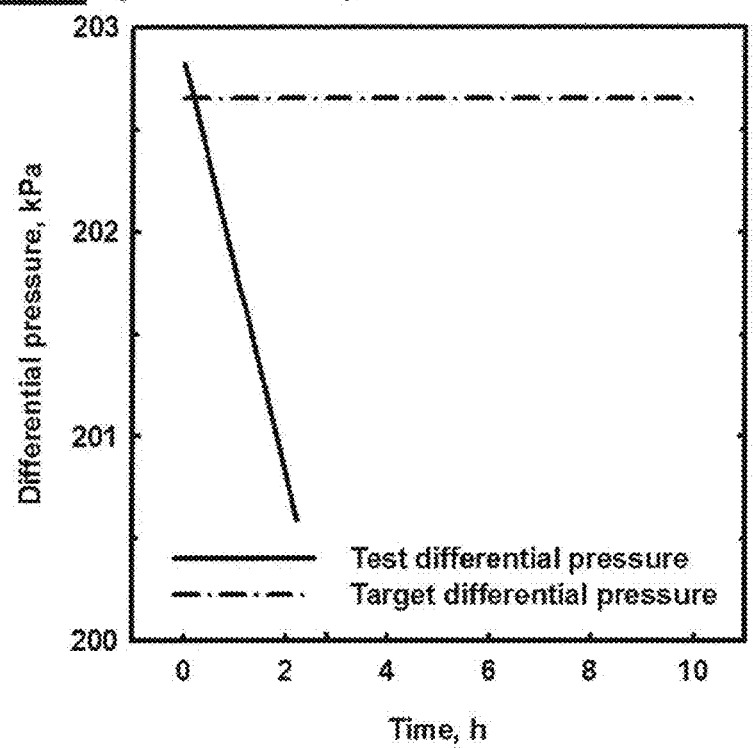
FIG. 2 is a graphic illustration of the of the standard pressure decay method with a mass point leak rate analysis known in the art having a disproportionately high leak rate for the system, causing the gas pressure to decrease too rapidly to acquire enough data to have acceptable measurement uncertainty.
Figure 3:
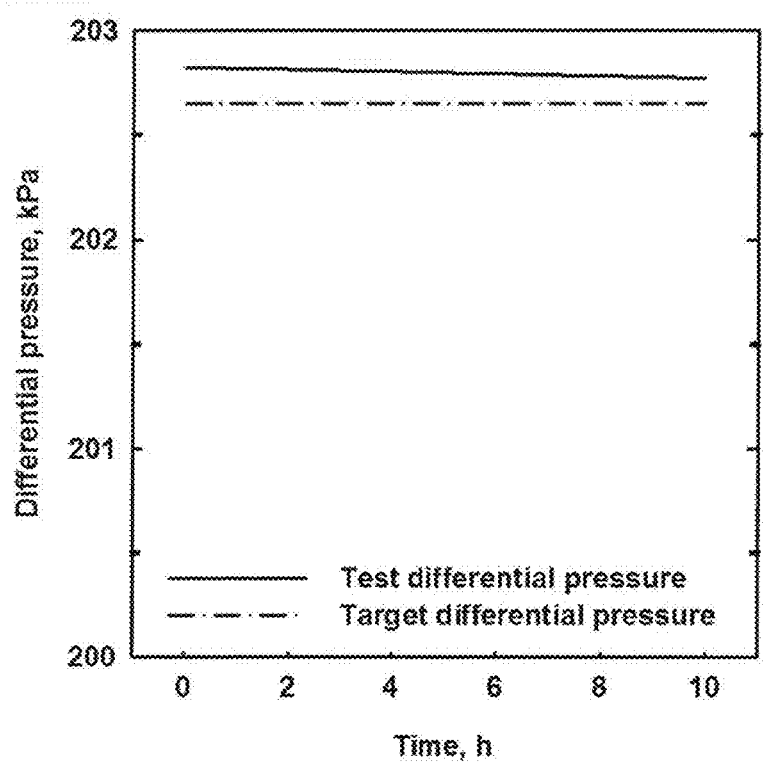
FIG. 3 is a graphic illustration of the of the standard pressure decay methods with a mass point leak rate analysis known in the art having a disproportionately high leak rate for the system unacceptably extending the duration of the test.

The uncontrolled pressure differential causes a variety of significant problems with known pressure decay methods with a mass point leak rate analysis. For example, to accurately quantify the leak rate of the nominally closed system using these prior art methods, the leak rate must be known (or closely estimated) a priori because the internal pressure and internal test section volume influence the pressure decay rate. In general, the system is designed around a desired leak rate at a specified pressure differential and the leak rate increases with increasing pressure differential. If the magnitude of the leak rate is too great with respect to the design of the rest of the system, the test's differential pressure crosses the target differential pressure too quickly and the amount of usable data surrounding the crossover point is limited. See FIG. 2. Conversely, if the magnitude of the leak rate is too small with respect to the design of the rest of the system, the test differential pressure approaches the target differential pressure very slowly, (see FIG. 3) and a long time is needed to reach the desired pressure differential. During this time period, test temperature and/or pressure outside the closed system may vary excessively degrading the data.

Accordingly, it is necessary when using these prior art methods to (know or accurately estimate) the leak rate of the nominally closed system before the leak rate test is configured and/or started. As a result, the test must be run twice; a first test to determine the leak rate, which is not likely to be of the highest quality, and, after adjustments are made to the system, a second test to try to obtain usable data. Any unexpected results generated during the first test are likely attributed to the lower quality of the measurement and may be dismissed and if there are any anomalies that occur during the first test and are not confirmed by the second test, then a third test may be required.

Moreover, in these prior art systems, mass loss and measurement uncertainty cannot be calculated until after the test is complete because the test operator must determine which subset of the collected data should be used for mass loss computations. Data is recorded throughout the duration of the test, but only a small subset of the data collected is actually used. The test operator determines when the data collection should stop and then which subset of the collected data should be used for mass loss computations. The retained data subset is centered at the pressure differential of interest and a portion of the data at the beginning of the data and a portion of the data at the end of the data set are discarded. This operation is undesirable as it may involve manipulation and computations on large data sets consuming long time durations, both computationally and for the operator. Collecting and then discarding this data is inefficient and a waste of time and resources. Further, while uncommon, at this point the operator may realize that the test was started or ended at inappropriate test conditions resulting in the test being rerun.

In addition, with these prior art methods, each test quantifies only one leak rate since the method cannot quantify leaks that vary with time because any variation with time is averaged into the test result. And while these methods do take temperature into account, they remain temperature sensitive. The temperature used in the calculations must accurately represent the fluid temperature, which may be challenging to accomplish. Finally, in these prior art methods, the duration of the leak test may vary depending upon the combination of test article leak rate and the size of the internal volume.

In the novel method of the present invention, however, these problems are overcome by using a control system to maintain a desired pressure differential across the test article throughout the test by raising or lowering the downstream pressure to account for changes in the pressure of the nominally closed system. See FIG. 7. This eliminates the potential for exceedingly long test duration due to a disproportionately low leak rate for the system, see, FIG. 8, line A. Maintaining a constant pressure differential also extended the test duration for tests of high leak rate test articles, (see FIG. 8, line B), thereby allowing for improved measurement uncertainty. By maintaining a constant pressure differential throughout the duration of the test (see FIG. 8, line C, it becomes possible to assume a constant leak rate throughout the duration of the test. Maintaining a constant leak rate results in all of collected data being valid thereby no data needs to be discarded.

This enhancement, while seemingly small, has been shown to make substantial and unexpected improvements to the productivity and results of these tests, overcoming or at least mitigating the problems with the prior art methods discussed above. As a result of this improvement, the apparatus and method of the various embodiments of the present invention is far more efficient than the existing test methods. The novel method of various embodiments of the present invention permits shortening otherwise long test durations, right-sizing the amount of data collected (i.e., eliminating wasted data collection at the beginning and end of the test, and eliminating tests terminated prematurely), utilizing low-cost hardware and instrumentation so the tests can be replicated in multiple test stands, providing quantifiable and controllable measurement uncertainty, reducing statistical variance, and eliminating post-process data analysis.

In one or more embodiments, the present invention is directed to a method for determining the rate of fluid loss from a nominally closed system across a test article comprising: providing a test article having a high pressure side and a low pressure side; providing a nominally closed system containing a fluid at a first pressure, wherein said nominally closed system is in fluid communication with the high pressure side of said test article and said nominally closed system is hermetically sealed except for said test article, through which said fluid may leak; providing a pressure controlled system having a second pressure that is lower than said first pressure, wherein said pressure controlled system is in fluid communication with the low pressure side of said test article; measuring and recording said first pressure as fluid leaks from said nominally closed system across said test article; adjusting said second pressure to maintain a predetermined pressure differential between said first pressure and said second pressure as the fluid leaks from said nominally closed system across said test article; and calculating the rate of loss of said fluid from said nominally closed system based upon the rate of change in said first pressure as the fluid leaks from said nominally closed system across said test article. In one or more embodiments, the novel method of the present invention may be practiced using the novel pressure decay-type leak rate measurement apparatus described above.

As set forth above, the method begins by selecting a test article and securing it with the test section of a testing apparatus, such as those described above. The test article is not particularly limited and may be any item intended to keep a fluid from passing through or around it including, without limitation, seals, gaskets, O-rings, bottles, chambers, vessels, piping, hoses, adhesives, space vehicles and combinations thereof. And as set forth above, the test section of a testing apparatus may have a variety of different configurations depending upon the particular test article used, but will hold the test article in an orientation wherein it forms a seal separating two volumes of fluid, preferably, in the same manner as it would during ordinary use.

For example, the test section 16 shown in FIGS. 4-6 is configured to hold a O-ring between a first and second platen 60, 62, compressing it in a manner consistent with its ordinary or anticipated use to form a seal (albeit one that will leak) between nominally closed system 12 and the controlled pressure system 14. As will be apparent, the nominally closed system 12 is on the high pressure side of and in fluid communication with the first side of the test article and the controlled pressure system 14 is on the low pressure side of and in fluid communication with the second side of the test article.

While the method according to one or more embodiments of the present invention is described herein with respect to ideal gases, it should be appreciated that any fluid the behavior of which can be described by an applicable thermodynamic equation of state, including but not limited to the Ideal Gas Law, Redlich-Kwong equation of state, Peng-Robinson equation of state, Elliott, Suresh, or Donohue equation of state at the temperature and pressure conditions for the test. Methods according to various embodiments of the present invention can be adapted to quantify mass leak rates for a wide variety of fluids, including any ideal gas, fluid/ideal gas mixture, or compressible liquid. Depending upon test conditions, suitable fluids may include, without limitation, air, oxygen, nitrogen, carbon dioxide, ethyl ether, hexane, and heptane.

As set forth above, the nominally closed system 12 is impermeable except for the test article and contains a known mass of fluid held at a pressure, which is greater than the pressure found within the controlled pressure system downstream of the test article and, preferably, higher than what is expected to be required for the test. As described above and shown in FIG. 4, the nominally closed system 12 further includes one or more sensors that measure the temperature of the internal volume of the nominally closed system 12 and transmitting temperature data to the controller 26 in such a manner that the temperature data sent may be utilized by the controller 26. In some embodiments, the temperature sensor 24 is electrically connected to the controller 26 by one or more electrical wires (not shown) and the temperature data is sent to the controller 26 as a voltage indicative of a particular temperature value. In some other embodiments, the temperature sensor 24 converts the temperature into a digital signal which is transmitted to the controller wirelessly or through an appropriate data transmission cable (not shown). In the embodiment shown in FIGS. 4-6, the temperature sensor 24 is a resistance temperature detector (RTD) located externally adhered to the side of a hermetic vessel 28 and transmits an electronic signal to the controller 26 via a wired connection.

As discussed above and shown in FIG. 4, the nominally closed system 12 also include one or more transducers 30 or other means for measuring the pressure of the fluid within the internal volume of the nominally closed system 12 and transmitting that information to the controller 26 for further analysis and processing. As set forth above, any suitable transducer 30 or other sensors capable of measuring the pressure inside the nominally closed system 12 and relaying the pressure information to the controller 26 in such a manner that the pressure data sent may be utilized by the controller 26, provided that it is chemically and physically compatible with fluid used and the expected temperatures and pressures of the internal volume of the nominally closed system 12. In some embodiments, the one or more transducers 30 or other pressure sensors are electrically connected to the controller 26 by electrical wiring (not shown) and the pressure information is sent to the controller 26 as a voltage indicative of a particular pressure value. In some other embodiments, the one or more transducers 30 or other pressure sensors convert the measured pressure into a digital signal which is transmitted to the controller wirelessly or through an appropriate data transmission cable (not shown). Suitable types of transducers 30 or other pressure sensors may include, without limitation, piezoresistive strain gauge, capacitive, electromagnetic, piezoelectric, optical, potentiometric, resonant, thermal or gas ionization. In the embodiment shown in FIGS. 4-6, the pressure transducer 30 is a potentiometric pressure transducer in fluid communication with the closed system and transmits an electronic signal to the controller via wired connection (not shown).

In some embodiments, the some or all of the nominally closed system 12, including any of the test section 16, pressure transducers 30, vessel 28, temperature sensor 24, and hermetic valve 34 where present, were contained within an environmentally control chamber controlled in order to minimize any differences between the temperature measurements and the actual gas temperature (particularly if temperature sensor 24 is located on the surface of the nominally closed system 12) and fluctuations in ambient temperature and barometric pressure.

As will be apparent, nominally closed system 12 must contain sufficient fluid to permit the test to run to completion. Accordingly, in some embodiments, the nominally closed system 12 further comprise hermetic vessel 28 which is sized to contain a known mass of fluid sufficient for the tests to be performed. The quantity of fluid required, and therefore the internal volume of hermetic vessel 28 required for the test, will depend upon a variety of factors including the leak rate, sensitivity of the pressure transducer, and expected duration of the test. In some embodiments, the fluid may be added or removed from the nominally closed system 12 by means of hermetic valve 34, as described above.

As described above, the novel method of various embodiments of the present invention further comprises a controlled pressure system downstream from and in fluid communication with the second side of the test article. As set forth above, the controlled pressure system adjusts the pressure downstream from the test article to maintain a predetermined pressure differential based upon control signals provided by the controller 26. Controller 26 may comprise one or more microcontroller, microprocessor, computer or combination thereof, and as discussed above and shown in FIG. 4, is operatively connected to temperature sensors 24 and pressure transducers 30 and receives and records the temperature and pressure of the closed system using a suitable data acquisition system, such as an analog or digital recorder. Controller 26 is also operatively connected to a pressure regulator 42, which is in fluid communication with controlled pressure system 14 downstream of test article 18 and receives input signals indicative of a measured pressure differential across the test article.

As set forth above, controller 26 is programmed to maintain a predetermined pressure differential by sending control signals to the pressure regulator 42 instructing it to adjust the pressure of the controlled pressure system. As set forth above, leak tests are ordinarily designed to evaluate and quantify a leak rate at a given pressure differential, ordinarily an operational pressure differential for the test article. Once arrived at, the desired pressure differential for evaluation is programmed into controller 26.

Generally, the controller arrives at the necessary pressure value to maintain the predetermined pressure differential by comparing stored desired pressure differential to a measured pressure differential and calculating revised "target" pressure value which is transmitted to the pressure regulator 42. The mechanism for measuring the pressure differential is not particularly limited. In the embodiments shown in FIGS. 4-6, for example, a differential pressure transducer 38 in fluid communication with both the nominally closed system 12 upstream of the test article and the controlled pressure system 14 downstream of the test article 18, measures the differential across the test article and transmits a signal indicative of the measured pressure differential to the controller. In some other embodiments, the controller calculates the pressure differential may be determined by comparing an upstream pressure value provided by pressure transducers 30 (first pressure sensor 84) on the nominally closed system 12 to a measured pressure value provided to the controller by the pressure regulator 42 (second pressure sensor 86). In some other embodiments, the controller may calculate the pressure differential by comparing pressure data received from an additional set of dedicated transducers or other pressure sensors located above and below the test article (84, 86).

However it is calculated, the controller compares the measured pressure differential to a stored set point value indicative of the predetermined desired pressure differential. In one or more embodiments, the controller then uses a proportional-integral control algorithm to calculate a new "target" pressure value that is necessary to maintain the desired pressure differential and sends a control signal to the pressure regulator instructing it to adjust the pressure to that new target value. The pressure regulator may adjust the pressure within controlled pressure system by any suitable means including, without limitation, the use of vents, vacuum pumps, pumps, air compressors, reservoirs of higher and lower pressure gas. In the embodiment shown in FIG. 4, for example, pressure regulator 42 is operatively connected to and in control of vacuum pump 44 and vent 46, and may send control signals to one or both directing them to remove/permit to escape sufficient fluid to reach the target pressure and with it, the desired pressure differential. In some other embodiments, the pressure regulator may be connected to and in control of reservoirs of higher and lower pressure gas, which may be used to raise or lower the downstream pressure as appropriate to obtain the desired pressure differential across the test article.

It is anticipated that the process for adjusting the pressure downstream of the test article will be repeated at regular intervals to maintain the desired pressure differential. These intervals can be set as often as necessary such that the pressure differential does not differ from the desired pressure differential by more than a predetermined amount. As will be appreciated, the interval required to insure that that the pressure differential does not differ from the desired pressure differential by more than a predetermined amount, will depend, among other things on the anticipated leak rate for the test article and the size of the nominally closed volume to be used. The faster the pressure in the nominally closed system is changing, the shorter the required interval will be. In some embodiments, the downstream pressure may be adjusted at intervals of from about 0.1 seconds to about 1 hour. In some embodiments, the downstream pressure may be adjusted at intervals of from about 0.1 seconds to about five minutes. In some embodiments, the downstream pressure may be adjusted at intervals of from about 0.1 seconds to about 1 minute. In some embodiments, the downstream pressure may be adjusted at intervals of from about 0.1 seconds to about 1 second. In some embodiments, the downstream pressure may be adjusted at intervals of from about 0.5 seconds to about 1 hour. In some embodiments, the downstream pressure may be adjusted at intervals of from about 0.5 seconds to about 1 minute. In some embodiments, the downstream pressure may be adjusted at intervals of from about 0.5 seconds to about 30 seconds. In some embodiments, the downstream pressure may be adjusted at intervals of from about 0.5 seconds to about 5 seconds. In some embodiments, the downstream pressure may be adjusted at an interval of about 1 second. In some embodiments, the downstream pressure may be adjusted at an interval of about 0.1 second.

As set forth above, controller 26 is operatively connected to temperature sensors 24 and pressure transducers 30 and receives and records the temperature and pressure of the closed system over time using a suitable data acquisition program, such as a personal computer-based digital recording system. These pressure and temperature values may be recorded continuously as they are received by the controller or at regular intervals. Shorter intervals results in more data being collected and faster test duration to reach a desired measurement quality, but greater computational effort and more needed data storage space. In some embodiments, the pressure and temperature data may be recorded on intervals of from about 10000 times per second to about 100 times per second. In some embodiments, the pressure and temperature data may be recorded on intervals of from about 100 times per second to about 1 time per second. In some embodiments, the pressure and temperature data may be recorded on intervals of from about 1 time per second to about 1 time per minute. In one or more embodiments, the data acquisition system in the controller collects the pressure and temperature measurements at a rate of from about 10000 Hz to about 100 Hz. In one or more embodiments, the data acquisition system in the controller collects the pressure and temperature measurements at a rate of from about 100 Hz to about 1 Hz. In one or more embodiments, the data acquisition system in the controller collects the pressure and temperature measurements at a rate of from about 1 Hz to about 1/60 Hz. In one or more embodiments, the data acquisition system in the controller collects the pressure and temperature measurements at a rate of from about Hz to about Hz. In one or more embodiments, the data acquisition system in the controller collects the pressure and temperature measurements at a rate of about 10 Hz.

As set forth above, the pressure decay-type leak rate measurement methods of various embodiments of the present invention operate by maintaining a predetermined desired pressure differential across the test article. While, as set forth herein, this can be done by controlling (generally reducing) the downstream pressure, it should be appreciated that it can also be done by adjusting the temperature, and with it the pressure, of the fluid in the nominally closed system upstream of the test article. Since the pressure of a system can be raised and lowered significantly faster and more uniformly than can the temperature of a system, it is ordinarily preferable to maintain the pressure differential across the test article by manipulating the downstream pressure, as described above. However, there may be some situations and/or applications of the pressure decay-type leak rate measurement methods of the present invention where it may be useful to adjust the temperature of the nominally closed system in order to maintain the pre-programmed desired pressure differential. In some situations, for example, it may not practical to provide a connection to the controlled pressure side, such as when there is insufficient geometric space, and it the pressure differential may be maintained by adjusting the temperature of the nominally closed system. Also, in cases where the test gas is expensive, it may be more economically practical to adjust the temperature of the nominally closed system rather than vent the test gas on the downstream side.

Similarly, in one or more embodiment, the pressure of the volume in the controlled pressure system may also be controlled by adjusting the temperature to maintain the desired pre-determined pressure differential. In these embodiments, controller 26 will calculate a target temperature for the controlled pressure system based upon pressure and/or temperature measurements received from sensors on the controlled pressure system and send a control signal to a temperature control means, which may include without limitation, air, radiant, and conductance heaters empowered by electrical resistance or temperature control fluids configured to effect the temperature of the controlled pressure system.

Accordingly, in one or more embodiments, pressure decay-type leak rate measurement apparatus of the present invention may further comprise a means for controlling the temperature of the fluid in the nominally closed system, which is connected to and controlled by controller 26. Suitable mechanisms for controlling the temperature of fluid in the nominally closed system may include without limitation, air, radiant, and conductance heaters empowered by electrical resistance or temperature control fluids. In some other embodiments, the mechanism for controlling the temperature of the fluid in the nominally closed system may be operatively connected to controller by one or more electrical wires or data cables. In some embodiments, the mechanism for controlling the temperature of the fluid in the nominally closed system may be operatively connected to controller via a wireless network, as described above.

In these embodiments, the pressure differential across the test article is measured and compared to a pre-programmed desired pressure differential as set forth above. As the fluid leaks out of the nominally closed system lowering its measured pressure, and with it the measure pressure differential across the test article, controller 26 will send a control signal to the means for controlling the temperature of the fluid in the nominally closed system described above, directing it to increase (or, in theory, decrease) the temperature of the nominally closed system to a temperature value that, applying Boyle's Law, corresponds to a target pressure necessary to maintain the pre-programmed, desired pressure differential across the test article.

One important benefit of the enhanced mass point leak rate method of the present invention is that, assuming the volume of the nominally closed system is known or accurately estimated, it is possible to calculate the test article's leak rate from the measured pressure and temperature data in near real-time (subject to the limitations of the controller and data acquisition software being used) while the test is still ongoing. Since the pressure differential is at the desired value throughout the entire duration of the test and the entire data set is valid, the leak rate and its associated quality may be calculated during the test. As will be appreciated by those of ordinary skill in the art, the test article's leak rate may be calculated using an appropriate thermodynamic equation of state for the particular type of fluid utilized in the experiment. One of ordinary skill will be able to determine the appropriate thermodynamic equation of state for a particular type of fluid, and will be able to calculate the mass loss rate without undue experimentation.

In order to compare embodiments of the present invention with prior art pressure decay method with mass point leak rate data analysis that use ideal gases, however, we will show the calculations for determining the mass leak rate assuming the fluid is an ideal gas. The meaning of various abbreviations and symbols used in the following Equations 1 through 10 are set forth in Table 1, below.

TABLE 1

| Nomenclature for Equations | |
|---|---|
| $a_0$ | zero-order regression coefficient |
| $a_1$ | first-order regression coefficient |
| $a_n$ | $n^{th}$-order regression coefficient |
| $\alpha$ | statistical significance |
| $\beta$ | bias error |
| $\beta_{t_i}$ | bias error at time index i |
| $\beta_m$ | Bias error of the mass measurement |
| i, k | indices |
| m | mass |
| $m_i$ | mass at index i |
| $\dot{m}$ | mass leak rate |
| N | number of samples |
| n | number of observations |
| p | absolute pressure |
| $\phi$ | precision error |
| $\phi_{t_i}$ | Precision error at time index i |
| $\phi_m$ | Precision error of the mass measurement |

TABLE 1-continued

Nomenclature for Equations

| | |
|---|---|
| R | specific gas constant |
| ρ | correlation coefficient |
| s | standard deviation |
| $\partial m_i$ | change in mass measurement at index i |
| $\partial \dot{m}$ | change in mass leak rate |
| T | temperature |
| t | time |
| $t_i$ | time at i |
| U | uncertainty |
| $U_{\dot{m}}$ | measurement uncertainty of mass leak rate |
| V | volume |
| $\bar{x}_n$ | mean of n observations |

Using the ideal gas law, the mass of gas within the nominally closed system may be calculated using Eqn. 1 for each time-step yielding a mass-time data set $(t_i, m_i)$.

$$m = \frac{pV}{RT} \quad (1)$$

However, as will be appreciated by those of skill in the art, the application of the standard pressure decay method would require the leak rate be computed after removing data not conforming to the desired differential pressure boundary conditions. Even applying the enhanced method, the differential pressure across the test article is at the desired pressure differential throughout the duration of the test; therefore, no data needed to be excluded. It should also be appreciated that the gas pressure loss, and therefore the mass loss, of the pressurized system with respect to time are characterized as exponential decays but they can also be modelled by the following polynomial:

$$m(t) = a_0 + a_1 x + a_2 x^2 \ldots + a_n x^n \quad (2)$$

$$\dot{m} = \frac{dm}{dt} = a_1 + 2a_2 x + \ldots + n a_n x^{n-1} \quad (3)$$

Both the standard (prior art) and the enhanced mass point leak rate method of the present invention assume that the leak rate is linear, which is a good approximation for small losses. Using this assumption, Eqns. 2 and 3 may be reduced as follows:

$$m(t) = a_0 + a_1 x \quad (4)$$

$$\dot{m} = \frac{dm}{dt} = a_1 \quad (5)$$

wherein $a_0$ represents the gas mass in the experimental setup at the beginning of the test (and is trivial) and $a_1$ represents the mass loss rate of the test article.

Still another important benefit in the enhanced mass point leak rate method of the present invention is that the uncertainty of mass loss may be calculated continuously (subject to the limitations of the controller and data acquisition software being used) and/or at regular intervals while the test is still ongoing. The controller can therefore, be programmed to continue the test until a particular predetermined uncertainty value is reached, ensuring that the quality of the mass leak rate value is sufficiently good.

The uncertainty of mass loss may be calculated based on the pressure and temperature data for the particular apparatus being used, the characteristics of the instruments used to record the data (for example, the precision and bias errors of the pressure transducers, the precision and bias errors of the temperature sensors, the accuracy of the time measurement, etc.), the quality of the volume measurement (that is, the precision and bias errors of the volume measurement), using the generalized Eqn. 6.

$$U_{\dot{m}}^2 = \sum_{i=1}^{N} \left(\frac{\partial \dot{m}}{\partial m_i}\right)^2 \beta_{m_i}^2 + \sum_{i=1}^{N} \left(\frac{\partial \dot{m}}{\partial t_i}\right)^2 \beta_{t_i}^2 + \sum_{i=1}^{N} \left(\frac{\partial \dot{m}}{\partial m_i}\right)^2 \phi_{m_i}^2 + \quad (6)$$

$$\sum_{i=1}^{N} \left(\frac{\partial \dot{m}}{\partial t_i}\right)^2 \phi_{t_i}^2 + 2 \sum_{i=1}^{N-1} \sum_{k=i+1}^{N} \left(\frac{\partial \dot{m}}{\partial m_i}\right)\left(\frac{\partial \dot{m}}{\partial m_k}\right) \rho_{m_i m_k} \beta_{m_i} \beta_{m_k} +$$

$$2 \sum_{i=1}^{N-1} \sum_{k=i+1}^{N} \left(\frac{\partial \dot{m}}{\partial t_i}\right)\left(\frac{\partial \dot{m}}{\partial t_k}\right) \rho_{t_i t_k} \beta_{t_i} \beta_{t_k} +$$

$$2 \sum_{i=1}^{N-1} \sum_{k=i+1}^{N} \left(\frac{\partial \dot{m}}{\partial t_i}\right)\left(\frac{\partial \dot{m}}{\partial m_k}\right) \rho_{t_i m_k} \beta_{t_i} \beta_{m_k}$$

As will be appreciated by those of ordinary skill in the art, the bias and precision errors used in Eqns. 6-10, below, are unique to each test apparatus. In some embodiments, each error may be obtained using each instrument's calibration records (e.g., pressure transducers), product specifications (e.g., RTD), or computations (e.g., the volume). Even where these values are not reported, techniques for calculating and/or measuring these errors are well known and one of ordinary skill in the art will be able to calculate them without undue experimentation.

Applying the assumption that any error in the time measurement was negligible ($\beta_{t_i} = \varphi_{t_i} = 0$) and utilizing correlation coefficients ($\rho_{m_i m_k} = 0$) that produced the maximum uncertainty[17], Eqn. 6 may be simplified to Eqn. 7.

$$U_{\dot{m}}^2 = \sum_{i=1}^{N} \left(\frac{\partial \dot{m}}{\partial m_i}\right)^2 \beta_{m_i}^2 + \sum_{i=1}^{N} \left(\frac{\partial \dot{m}}{\partial m_i}\right)^2 \phi_{m_i}^2 \quad (7)$$

where, $$\beta_m^2 = \left(\frac{V}{RT}\beta_P\right)^2 + \left(\frac{p}{RT}\beta_V\right)^2 + \left(\frac{pV}{T}\beta_R\right)^2 + \left(\frac{pV}{R}\beta_T\right)^2 \quad (8)$$

$$\phi_m^2 = \left(\frac{V}{RT}\phi_P\right)^2 + \left(\frac{p}{RT}\phi_V\right)^2 + \left(\frac{pV}{T}\phi_R\right)^2 + \left(\frac{pV}{R}\phi_T\right)^2 \quad (9)$$

and $$\frac{\partial \dot{m}}{\partial m_i} = \frac{N t_i - \sum_{i=1}^{N} t_i}{N \sum_{i=1}^{N} (t_i^2) - \left(\sum_{i=1}^{N} (t_i)\right)^2} \quad (10)$$

The square root of $U_{\dot{m}}^2$ provides the measurement uncertainty value ($U_{\dot{m}}$).

While prior art leak rate analysis methods allowed computation of the leak rate and measurement uncertainty only after the test had concluded (see, Eqns. 4-5), the enhanced leak rate analysis method of the present invention is capable of computing the leak rate and associated uncertainty (see, Eqns. 4-10) at each time step in near real-time while the test is still ongoing. In some embodiments, the mass loss rate of the test article and/or measurement uncertainty may be calculated on a continuous or near continuous basis (subject to the limitations of the controller and data acquisition software being used) as the temperature and pressure data is received by the controller.

This is not necessary, however, and in some embodiments, the mass loss and/or measurement uncertainty may be calculated at regular intervals of from about 0.1 second to about 1 hour. In some of these embodiments, the mass loss and/or measurement uncertainty may be calculated at regular intervals of from about 0.1 second to about 30 minutes. In some of these embodiments, the mass loss and/or measurement uncertainty may be calculated at regular intervals of from about 0.1 second to about 15 minutes. In some of these embodiments, the mass loss and/or measurement uncertainty may be calculated at regular intervals of from about 0.1 second to about 5 minutes. In some of these embodiments, the mass loss and/or measurement uncertainty may be calculated at regular intervals of from about 0.1 second to about 1 minute. In some of these embodiments, the mass loss and/or measurement uncertainty may be calculated at regular intervals of from about 1.0 second to about 1 hour. In some of these embodiments, the mass loss and/or measurement uncertainty may be calculated at regular intervals of from about 1.0 second to about 1 hour. In some of these embodiments, the mass loss and/or measurement uncertainty may be calculated at regular intervals of from about 1.0 minute to about 1 hour. In some of these embodiments, the mass loss and/or measurement uncertainty may be calculated at regular intervals of from about 10 minutes to about 30 minutes.

Computing the uncertainty in near real-time or at intervals during the test allows the software to automatically stop the test when a target uncertainty is reached. As more data is recorded and the leak rate is calculated (that is, estimated). The calculated estimate of the true leak rate value changes with each additional set of data collected. The uncertainty, that is the maximum difference between the estimate and the true value, typically is reduced as more data is collected. This process may be repeated as more data is collected thereby reducing the uncertainty asymptotically toward some minimum value. It is desirable to test for a long time duration to minimize the uncertainty, but is undesirable to utilize equipment and resources for long periods. This is not necessary, however, and in some embodiments, the test duration may be from about 10 seconds to about 1 hour. In some embodiments, the test duration may be from about 1 hour to about 24 hours. In some embodiments, the test duration may be from about 1 day to about 1 week.

Figure 9:
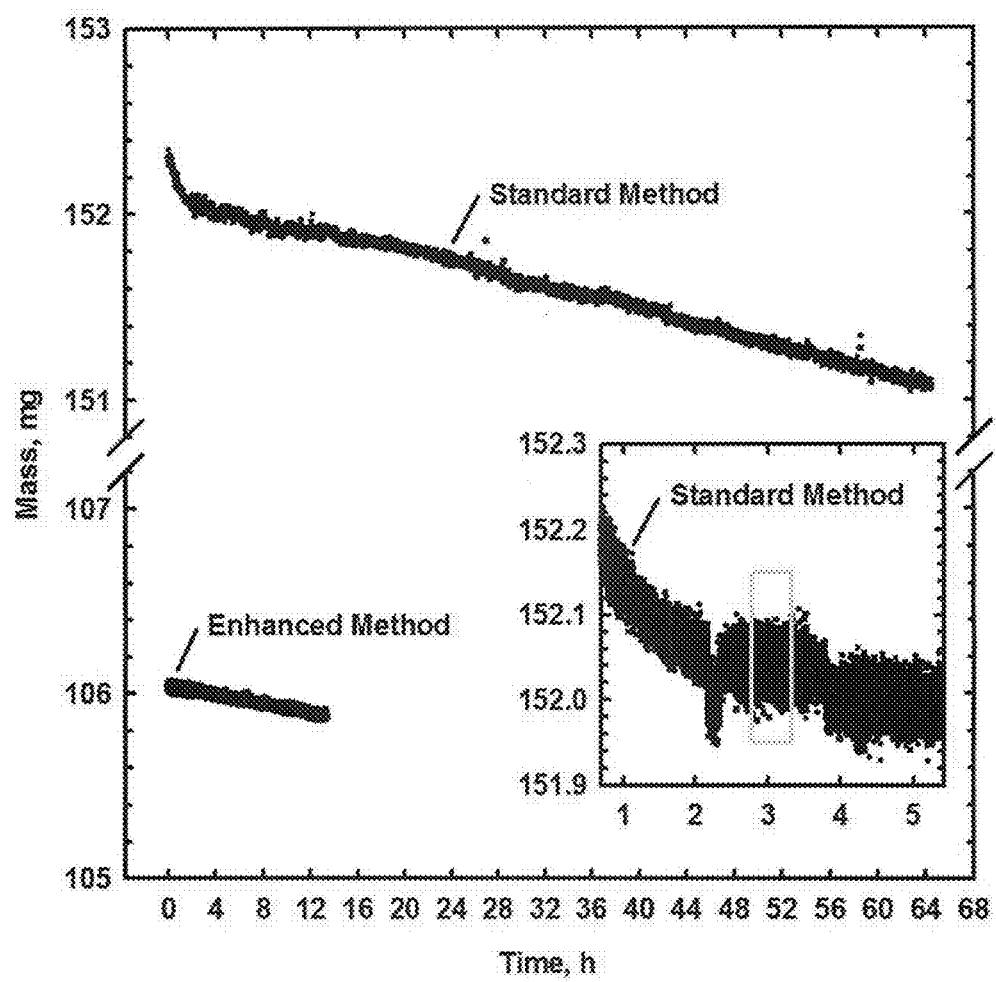
FIG. 9 is a graph reporting mass-time data of test articles using both apparatus and method for determining the rate of fluid loss from a nominally closed system across a test article according to one or more embodiments of the present invention and a standard pressure decay method with a mass point leak rate analysis known in the art. The inset image is a graph showing the mass-time subset from which the best-fit line was computed meeting the three criteria.

By utilizing a controller and maintaining the desired pressure differential, all the data acquired was available to compute the test article's leak rate, unlike the prior art methods where a large portion of the data is discarded. See e.g., FIG. 9. While the test duration is predominantly dependent upon the desired measurement uncertainty; it will be appreciated that the leak rate and high-pressure side fluid volume are also important to test duration.

Further, in order to improve the quality of the quantified mass loss rate (i.e., reduce the uncertainty and/or raise the confidence level), several modifications to the system may be considered. In one or more embodiments, multiple pressure measurement devices may be used, instead of one and their results averaged to provide more accurate temperature values and reduced measurement uncertainty. Similarly, in some embodiments, multiple pressure measurement devices may be used and their results averaged, instead of one to provide more accurate pressure values and reduced measurement uncertainty. The quality of the mass loss rate may also be improved by such things as better quantifying volume of the nominally closed system, increasing the purity of the gas or other fluid used, and recording greater quantities of data for use in the calculations.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

To compare the performance of the enhanced leak rate analysis method of the present invention and standard prior art leak rate methods, similar experimental test setups were used to measure the leak rates of a series of similar test articles. The test hardware is described below.

Experimental Hardware Setup

A. Test Installation

The test section used with the enhanced test method was comprised of two test platens manufactured from stainless steel, each with surface roughness better than 0.4 µm. The test article was installed into a standard O-ring groove in the bottom platen and compressed against the flat surface of the top platen, FIG. 5-6. The platens were assembled such that each test article was compressed by 25% of its nominal height. The test gas used was dry air and was supplied to the test article's interior from the high-pressure side of the apparatus at approximately 124 kPa. During testing with the enhanced method, the control system reduced the pressure on the low-pressure side of the apparatus until the pressure differential across the seal was 101 kPa.

The mass loss calculations were computed by the data acquisition and control system using gas properties on the high-pressure side of the test apparatus and Eqns. 1 and 2. The gas pressure was monitored using two pressure transducers. The average of the two readings at each time step was used in the computations. The temperature was monitored using a Class A accuracy resistance temperature detector (RTD) attached to the external surface of the volume, see FIG. 4. The volume of the high-pressure side was determined using an average of 248 applications of Boyle's law (i.e., $p_1 V_1 = p_2 V_2$). The size of the volume was approximately 70.59 ml for each of the three test setups used to collect the data.

The bias and precision errors used in Eqn. 5 were unique to each of the three test apparatus used during the study. Each error was obtained using each instrument's calibration records (e.g., pressure transducers), product specifications (e.g., RTD), or computations (e.g., the volume). A table of representative values is presented for the reader's understanding in Table 2.

TABLE 2

Representative values of bias and precision errors.

| Instrument | Bias error | Precision error |
| --- | --- | --- |
| Pressure transducer | 26 Pa | 9.7 Pa |
| RTD | 0.196° C. | 0.022° C. |
| Volume | 2.131 ml | 0.392 ml |

To minimize differences between the temperature measurements and the actual gas temperature, the test section, pressure transducers, volume, RTD, and hermetic valve were contained within an environmental control chamber. The intended test temperature was 23° C.

The test section used to implement the standard method was very similar to the hardware used with the enhanced method; however, there were some key differences. Instead of being connected to the control system, the low-pressure port was vented to the ambient laboratory environment and the vacuum seal was removed. In this configuration, air leaked past the test article directly into the ambient laboratory environment. To achieve the same nominal pressure differential across the test article created using the enhanced method, the high-pressure air supply used with the standard test method was increased to approximately 200 kPa. The system was allowed to leak, lowering the pressure differential, until 101 kPa was achieved. The similar pressure differential across the test article facilitated a comparison of leak rate results for replicate seals evaluated using the two respective test methods.

B. Test Articles

The test articles were standard AS568A size 2-309 O-rings manufactured from S0383-70 silicone elastomer compound by Parker Hannifin Corporation. The nominal dimensions of the specimens are shown in Table 3.

TABLE 3

Nominal dimensions of the test articles.

| Inner diameter, mm | Thickness, mm |
| --- | --- |
| 10.5 ± 0.127 | 5.33 ± 0.127 |

The samples were cleaned with isopropyl alcohol and allowed to air dry. One lot was tested in an as-manufactured state, without protectant or lubrication applied. Six test articles were evaluated using the enhanced method, and six test articles were evaluated using the standard method for comparison. An additional set of specimens were pretreated such that the leak rate would be higher. These test articles were exposed to atomic oxygen and ultraviolet radiation which are both known to degrade sealing performance. Four test articles were evaluated using the enhanced method, and six test articles were evaluated using the standard method for comparison.

C. Data Acquisition System

A computer-based data acquisition system collected the pressure and temperature measurements at a rate of approximately 10 Hz. When implementing the enhanced method, pressure and temperature measurements were combined with the previously quantified volume to compute the mass of gas at each time-step, as set forth above. The history of mass computations was used to compute the leak rate and its associated uncertainty in real-time throughout the duration of the test. The software allowed the system to run continuously as long as the pressure differential did not decrease by 6.9 kPa due to insufficient high-pressure side gas supply. The test continued until the mass loss measurement uncertainty was below 10%, with a minimum duration of five minutes and a maximum of 24 hours.

When implementing the standard method of the prior art, pressure and temperature measurements were collected at similar sample rates. Tests were initiated after pressuring the internal volume until the pressure differential was above 101 kPa. The system was manually stopped after observed the pressure differential was sufficiently below 101 kPa and estimated sufficient data was collected. A subset of the data was extracted. Finally, the leak rate and associated uncertainty were computed.

RESULTS AND DISCUSSION

Figure 10:
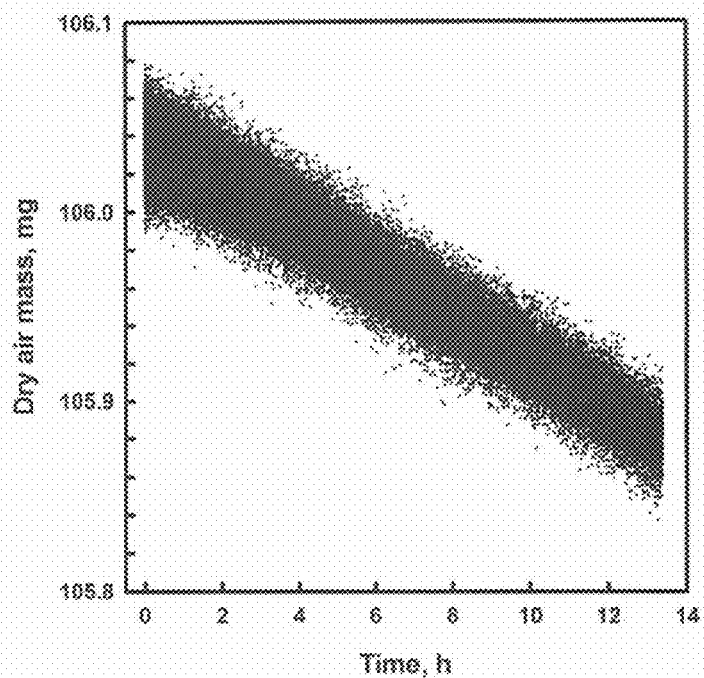
FIG. 10 is a graph showing typical mass response for an apparatus and method for determining the rate of fluid loss from a nominally closed system across a test article according to one or more embodiments of the present invention.
Figure 11:
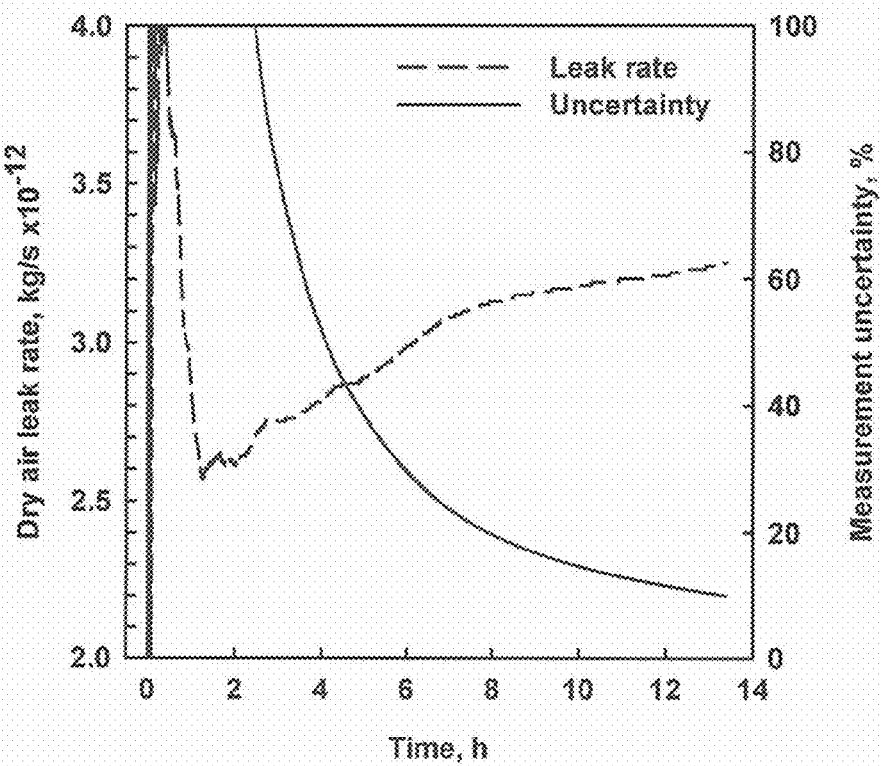
FIG. 11 is a graph report typical leak rate calculation and measurement uncertainty values over time for an apparatus and method for determining the rate of fluid loss from a nominally closed system across a test article according to one or more embodiments of the present invention.

The mass of dry air is shown in FIG. 10 for a typical test article evaluated in using the enhanced method. The mass of the dry air contained within the volume decayed linearly with time due to the constant pressure differential, though a test utilizing a large volume or short duration would also exhibit this behavior. For a test article evaluated using the enhanced method, the leak rate and associated measurement uncertainty are shown in FIG. 11. The curves' characteristics were typical, but values were dependent upon the instruments used, their bias and precision errors, the specimen leak rate, the stability of the temperature, and the volume size. The main enhancement of this test method, the controlled pressure differential, was programmed to be 101.4 kPa for each test. During the particular test shown in FIG. 10-11, the differential pressure oscillated between 101.14 and 101.28 kPa. While leak rate is dependent upon the differential pressure across the test article, oscillation of this magnitude were considered an insignificant influence.

During the first hour of the test, the value of computed leak rate varied significantly due to the combination of scatter in the pressure and temperature measurements and the short time interval. (See FIG. 11). Unrealistically large and negative computed leak rate values were common. As expected, the corresponding uncertainties were large due to the magnitude of computed leak rate variation. As the test continued, the mass loss from the volume and the time duration became more significant than the scatter, and the measurement uncertainty was reduced. It should be noted that the test article's leak rate was assumed to be constant during the course of the experiment, only the value of computed leak rate changed.

1. Low Leak Rate Test Articles

The software automatically stopped each test when the leak rate uncertainty was below 10%, generally after 10 to 18 hours. The average leak rate of the six test articles was $3.27 \times 10^{-12}$ kg/s, see FIG. 8. The standard deviation, which quantifies the dispersion of measurements, was $0.68 \times 10^{-12}$ kg/s. The error bars represented the measurement uncertainty for each leak rate. Since the tests were concluded only when the measurement uncertainty was at or below 10%, the error bars were proportional lengths. The uncertainty threshold was arbitrarily set to 10%. Other acceptable levels could have been chosen to suit the application and would have resulted in different test durations.

The data collected for the six additional replicate test articles used an uncontrolled pressure mass point leak rate system required extensive manual post-processing, as described in Garafolo, N. G., and Daniels, C. C., "Mass point leak rate technique with uncertainty analysis," *Research in Nondestructive Evaluation.* 25 (2) 2014: 125-149, the disclosure of which is incorporated herein by reference in its entirety.

For each test conducted, the range of usable data from the traditional method tests was determined using the coefficients of best-fit line through the mass-time data. The largest symmetric interval of mass-time data about the desired differential pressure (101.4 kPa) was used to compute the leak rate given the following constraints. The statistical significance of the linear coefficient was greater than 1.96, meaning there was a significant linear component to the mass-time trend. The significance of the second-order coefficient was below 1.96, meaning there was an insignificant amount of curvature to the mass-time data set. Since physically the mass loss should be an exponential decay, having a linear trend without a significant amount of curvature satisfies the uncertainty calculation assumptions and generally produced the smallest (and most desirable) measurement uncertainty value.

The determination of which data was to be used in the leak rate calculation could not be done while the experiment was being conducted. Only after the test, when the range of data about the desired differential pressure was known, was the uncertainty computed. As the uncertainty was computed from the test data used, the uncertainties were unique for each experiment. Therefore, the error bar magnitudes were unique for each of these tests. The resultant measurement uncertainties were between 23 and 82%.

Figure 12:
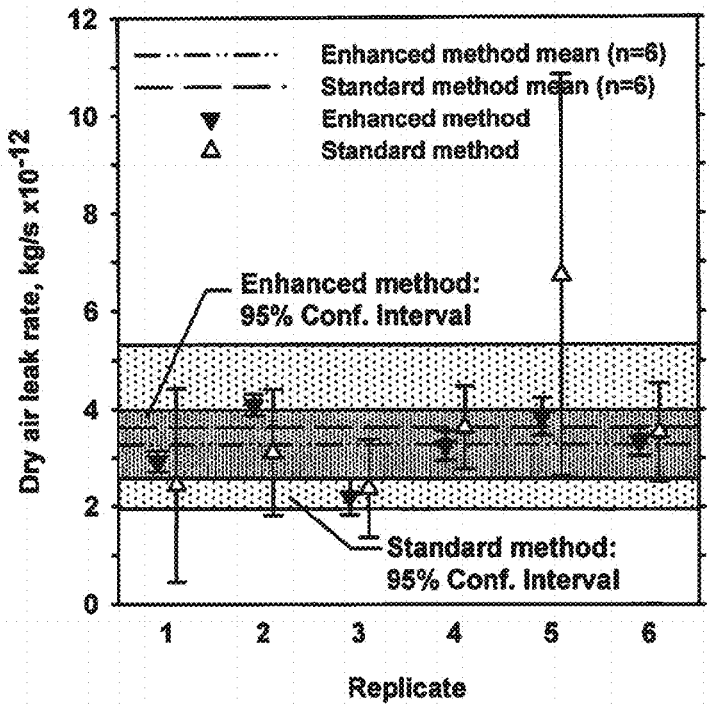
FIG. 12 is a graph reporting leak rates of test articles having a relatively low leak rate using an apparatus and method for determining the rate of fluid loss from a nominally closed system across a test article according to one or more embodiments of the present invention and a standard pressure decay method with a mass point leak rate analysis known in the art. The error bars represent the measurement uncertainty of each trial computed individually using Eqns. 6-10, below. The shaded areas represent 95% confidence intervals for each method.

The results for those six tests are also shown in FIG. 12. The mean of calculated leak rates was $3.63 \times 10^{-12}$ kg/s with a standard deviation of $1.61 \times 10^{-12}$ kg/s. The test durations, between 45 and 65 total hours, were much longer than the enhanced method. Only three and 10 hours of data were used for the leak rate computations, since the pressure differential (101.4 kPa) was not satisfied during most of the test. Data recorded before and after this interval were discarded.

To compare the leak rates determined using each method, the computed mean ($\bar{x}_n$) of the six observations did not describe which method was more desirable, as the true leak rate value was not known. Confidence intervals were computed to show the interval in which the true mean should exist. Ranges and 95% confidence intervals for the standard mass point leak rate method the new method were (1.94E-12 kg/s, 5.31E-12 kg/s) and (2.56E-12 kg/s, 3.98E-12 kg/s). As shown in FIG. 12, the confidence interval for the new method was desirably smaller than that of the standard method. The interpretation was that the experiments using the new method resulted in a mean value with better accuracy than the standard method.

Comparing the leak rate results determined using the two methods, standard deviation of leak rate was decreased by approximately half through implementation of the enhanced method. Test duration was reduced such that one test per work day could be completed, compared with one test every two to three days when using the standard method. In addition, measurement uncertainty was controlled and greatly improved, by up to 88%, in tests where the enhanced method was employed.

Figure 8:
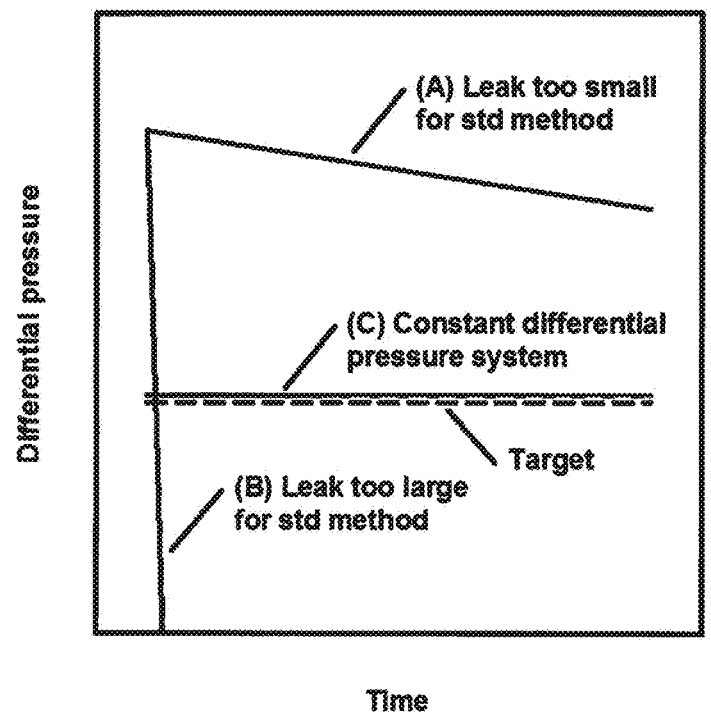
FIG. 8 graphic illustration of the intended performance of the constant differential pressure leak rate system (line C) of various embodiments of the present invention compared with that of the standard pressure decay methods with a mass point leak rate analysis known in the art having exceedingly long test duration due to a disproportionately low leak rate for the system (line A) and a disproportionately short test duration due to a disproportionately high leak rate for the system (line B).

When using a system that does not employ a downstream pressure controller, the gas leaks past the test article and into uncontrolled ambient or constant vacuum pressure. The test duration is dictated by the time necessary to reach the desired differential pressure. The measurement uncertainty is controlled by the amount of time the system is near the desired differential pressure. This time may be very short for high leak rate test articles and for periods of rising barometric pressure, as illustrated in FIG. 8. This time may be very long for low leak rate test articles and for periods of falling atmospheric pressure. In an unfortunate situation, the leak rate may be similar to the falling barometric pressure and the system may "chase" the desired differential pressure for days.

By utilizing a controller and maintaining the desired pressure differential, all the data acquired was available to compute the test article's leak rate. The test duration was predominantly dependent upon the desired measurement uncertainty; however, leak rate and high-pressure side volume size were very important. Controlling the measurement uncertainty eased data interpretation as each test was run until the same uncertainty was obtained. The appearance of the data conveyed confidence that the experiments were well controlled, since the error bars were similar in magnitude, as in FIG. 12. The comparison between data sets as data points was also eased as each datum point was afforded equal weighting. This may not be the case for data with disproportionately large measurement uncertainty, (e.g., standard method sample 5 in FIG. 12).

2. High Leak Rate Test Articles

Similar to tests conducted on low-leak rate specimens, tests were conducted on test articles with higher expected leak rates. Evaluations were conducted of two data sets generated with the enhanced and standard mass point leak rate methods. There were six data points in the set of data using the uncontrolled downstream pressure, and four using the control system to maintain a constant differential pressure between the upstream and downstream pressures. The leak rate data was plotted in FIG. 13, along with the measurement uncertainty for each leak rate.

Figure 13:
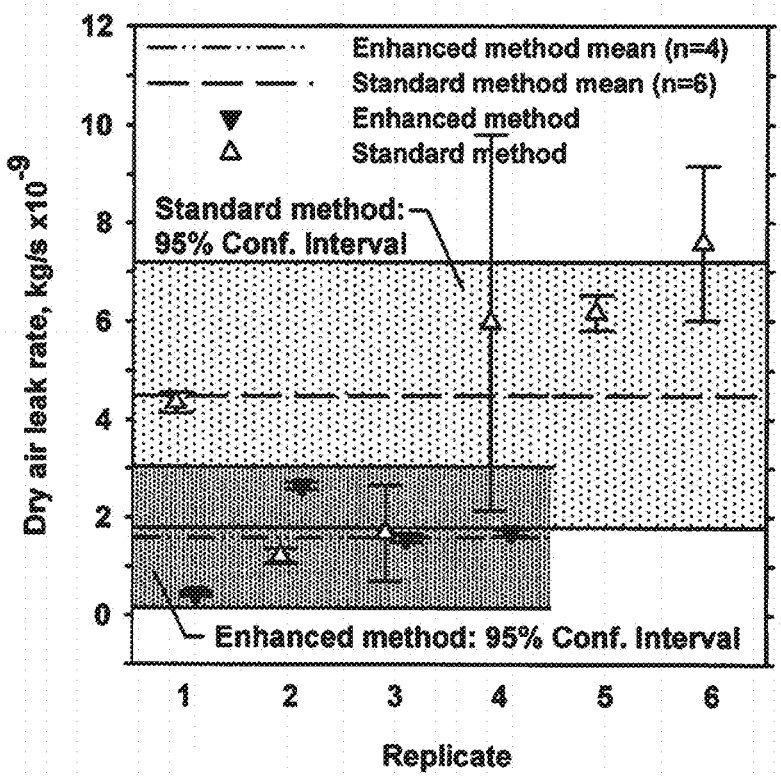
FIG. 13 is a graph reporting leak rates of test articles having a relatively low leak rate using an apparatus and method for determining the rate of fluid loss from a nominally closed system across a test article according to one or more embodiments of the current art and a standard pressure decay method with a mass point leak rate analysis known in the art. The error bars represent the measurement uncertainty of each trial computed individually using Eqns. 6-10, below. The shaded areas represent 95% confidence intervals for each method.
Figure 14:
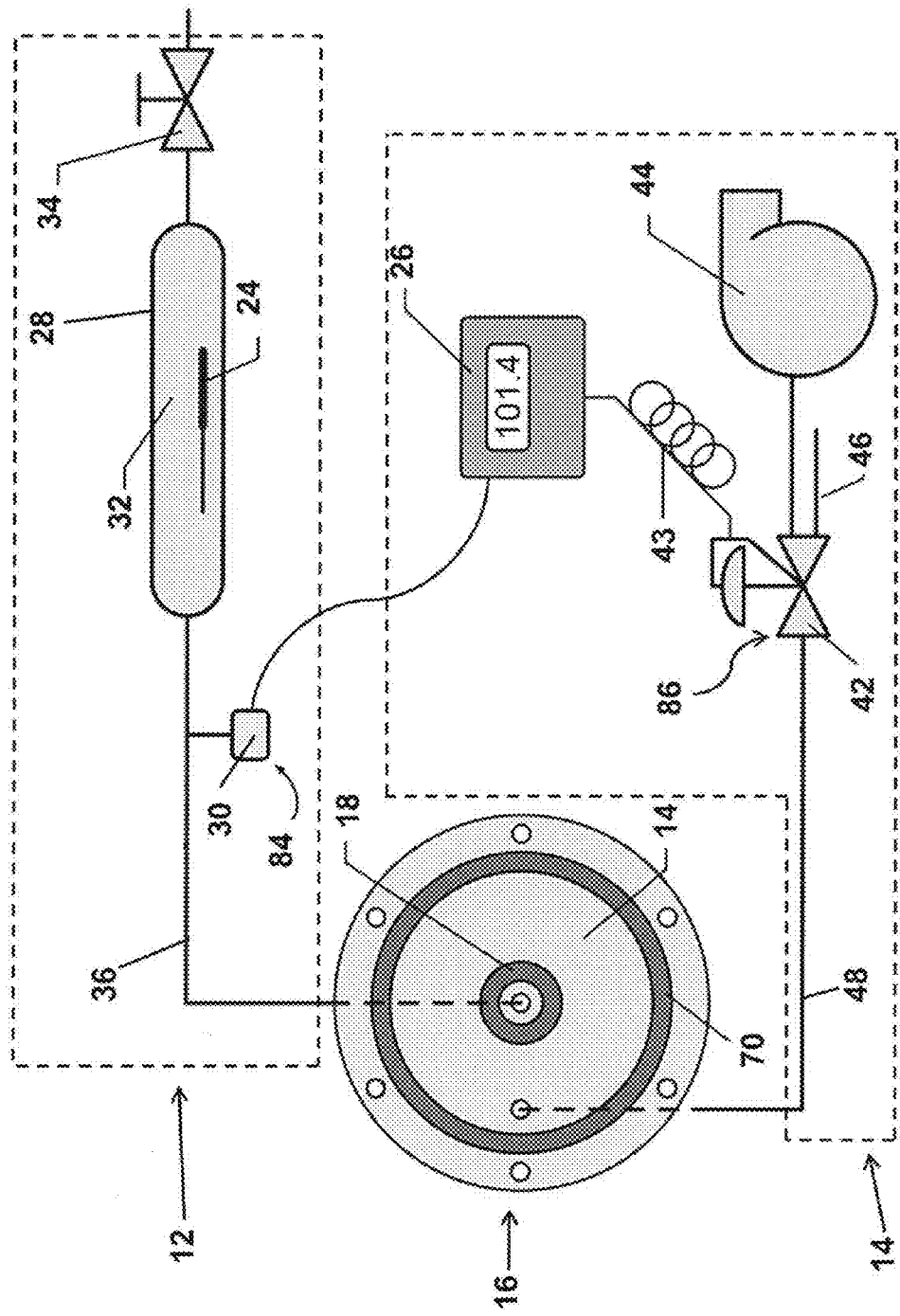
FIG. 14 is a schematic diagram of an apparatus for determining the rate of fluid loss from a nominally closed system across a test article according to one or more embodiments of the present invention.

Again since the true leak rates were unknown, confidence intervals were used to understand consistency of the method. Using n=6 for the uncontrolled downstream pressure data set, n=4 for the controlled differential data set, and α=0.05 for both sets, confidence intervals were computed. For the standard and enhanced mass point leak rate methods the confidence intervals were (1.79E-09 kg/s, 7.19E-09 kg/s) and (1.41E-10 kg/s, 3.04E-09 kg/s), respectively. The variability of the enhanced method, as quantified by its confidence interval, was desirably smaller (1.63E-09 kg/s) than that of the standard method (5.40E-09 kg/s), as shown in FIG. 13.

The data acquisition and control system was programmed to record data for a minimum of 10 minutes; after 10 minutes, the experiment was stopped if the measurement uncertainty was below 10%. The rates of the high leak test articles were so high that the measurement uncertainties were below 10% after 10 minutes, so all of the enhanced method tests concluded at that time. The resultant measurement uncertainties ranged from 2.9% to 10%. Similarly, the durations of the standard method tests were also short, but for another reason. Since the leak rate of these articles were so high, the differential pressure started above and ended below the desired target of 101 kPa. This process took between 1 and 10 minutes. The data was post-processed to determine the measurement uncertainties. The uncertainties were between 5.8% and 64% with the shortest test durations resulting in the highest measurement uncertainties. This observation was expected since the short test duration didn't allow for the collection of sufficient quantities of data to result in a low measurement uncertainty.

CONCLUSIONS

An enhancement to the standard pressure decay method with mass point leak rate analysis was made by adding a differential pressure control system. The addition of a control system provided a constant pressure differential across the test article by raising or lowering the downstream gas pressure, as appropriate. The test duration was not extended waiting for the desired pressure differential to occur. As a result, the mass leak rate and measurement uncertainty were computed in real-time. The overall test duration was brought under control as the test was programmed to automatically stop when specified criteria were met; most importantly, the test was stopped when a predefined level of measurement uncertainty was met. The method with enhancement was compared with a method that permitted the downstream pressure to be uncontrolled atmospheric pressure by measuring the leak rate of AS568A size 2-309 silicone O-rings. Two sets of test articles were used to compare the results from the standard and enhanced test methods; one set had a low leak rate while the other set received a surface pretreatment to increase their leak rates. The leak rate values obtained using both methods were similar. When compared to the results of the standard method, the results computed by the new method had significantly lower measurement uncertainty. The low leak rate specimens uncertainties were 10% compared to 23-82% for the standard method. The high leak rate specimens uncertainties were 2.9-10% compared with 5.8-64%. For the low leak rate specimens, the enhance method test durations were shorter, a single day compared with two to three days for the standard method. Implementation of this enhanced leak rate method into developmental spaceflight programs may lead to reduced project schedule and cost while improving the quality and reliability of the obtained data.

In light of the foregoing, it should be appreciated that the present invention significantly advances the art by providing an apparatus and method for quantification of gas loss from a closed system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An apparatus for determining a rate of fluid loss from a nominally closed system across a test article comprising:
    a test article having a high pressure side and a low pressure side;
    a nominally closed system containing a fluid having a first pressure and one or more sensors for measuring a temperature inside said nominally closed system, wherein said nominally closed system is in fluid communication with the high pressure side of said test article;
    a pressure controlled system having a second pressure, wherein said pressure controlled system is in fluid communication with the low pressure side of said test article, and said second pressure is lower than said first pressure, thereby creating a predetermined pressure differential between said first pressure and said second pressure; and
    a means for controlling said second pressure to maintain the predetermined pressure differential as the fluid is lost from said nominally closed system across said test article.

2. The apparatus of claim 1 wherein said test article comprises one or more seal, gasket, O-ring, bottle, chamber, piping, or combinations thereof.

3. The apparatus of claim 1 wherein said nominally closed system further comprises:
    a vessel having a known internal volume;
    one or more transducers for measuring the pressure inside said nominally closed system; and
    a hermetic valve.

4. The apparatus of claim 1 wherein said pressure controlled system comprises a pressure regulator, a vent, and/or a vacuum pump.

5. The apparatus of claim 1 wherein said means for controlling the second pressure comprises:
    a microcontroller programmed to maintain a predetermined pressure differential between said first pressure and said second pressure;
    a differential pressure transducer operatively connected to both the nominally closed system and the pressure controlled system, said differential pressure transducer providing an output signal to said microcontroller indicative of a measured pressure differential between said first pressure and said second pressure;
    a pressure regulator in fluid communication with said pressure controlled system, wherein said pressure regulator is operatively connected to and controlled by said microcontroller; and
    a pump for increasing or decreasing said second pressure; said pump operatively connected to and controlled by said pressure regulator.

6. The apparatus of claim 1 wherein said means for controlling the second pressure comprises:
    a microcontroller programmed to maintain a predetermined pressure differential between said first pressure and said second pressure;
    a first pressure sensor for measuring said first pressure, wherein said first pressure sensor is operatively connected to both said nominally closed system and said microcontroller and provides an output signal to said microcontroller indicative of said first pressure;
    a second pressure sensor for measuring said second pressure, wherein said second pressure sensor is operatively connected to both said pressure controlled system and said microcontroller and provides an output signal to said microcontroller indicative of said second pressure;
    a pressure regulator in fluid communication with said pressure controlled system, wherein said pressure regulator is operatively connected to and controlled by said microcontroller; and
    a pump for increasing or decreasing said second pressure; said pump operatively connected to and controlled by said pressure regulator.

7. The apparatus of claim 1 wherein said fluid is an ideal gas, a two-phase (fluid/gas) separation, or a compressible liquid.

8. The apparatus of claim 1 wherein said fluid comprises: an ideal gas selected from the group consisting of hydrogen, helium, neon, argon, xenon, radon, oxygen, nitrogen, carbon dioxide, air; a compressible fluid selected from the group consisting of ethyl ether, hexane, and heptane; or a two-phase (fluid/gas) separation consisting of water and air or oil and argon.

9. A method for determining a rate of fluid loss from a nominally closed system across a test article comprising:
    A. providing a test article having a high pressure side and a low pressure side;
    B. providing a nominally closed system containing a fluid at a first pressure, wherein said nominally closed system is in fluid communication with the high pressure side of said test article and said nominally closed system is hermetically sealed except for said test article, through which said fluid may leak;

C. providing a pressure controlled system having a second pressure that is lower than said first pressure, wherein said pressure controlled system is in fluid communication with the low pressure side of said test article;

D. measuring and recording said first pressure as fluid leaks from said nominally closed system across said test article;

E. adjusting said second pressure to maintain a predetermined pressure differential between said first pressure and said second pressure as the fluid leaks from said nominally closed system across said test article; and F. calculating the rate of loss of said fluid from said nominally closed system based upon a rate of change in said first pressure as the fluid leaks from said nominally closed system across said test article.

10. The method of claim 9 wherein said fluid is an ideal gas, a two-phase (fluid/gas) separation, or a compressible liquid.

11. The method of claim 9 wherein said fluid comprises: an ideal gas selected from the group consisting of hydrogen, helium, neon, argon, xenon, radon, oxygen, nitrogen, carbon dioxide, air; a compressible fluid selected from the group consisting of ethyl ether, hexane, and heptane; and/or a fluid/gas separation consisting of water and air or oil and argon.

12. The method of claim 9 wherein the step of measuring is performed using one or more pressure transducers.

13. The method of claim 9 wherein the step of recording and the step of calculating are performed using a microcontroller.

14. The method of claim 9 wherein the rate of loss of said fluid is calculated continuously or at regular intervals of from about 0.1 second to about 1 hour.

15. The method of claim 9 further comprising:
G. measuring the temperature of the fluid in said nominally closed system; and
H. calculating the measurement uncertainty from the measured temperature and the measured first pressure.

16. The method of claim 9 further comprising:
I. programming the microcontroller to automatically stop the test when specific predetermined criteria have been reached.

17. The method of claim 16 wherein said specific predetermined criteria comprises a measurement uncertainty value.

18. The method of claim 9 further comprising:
J. storing a target pressure differential in a microcontroller;
K. measuring the pressure differential between said first pressure and said second pressure and sending an output signal indicative of said measured pressure differential to said microcontroller;
L. providing a means for adjusting said second pressure that is operatively connected to said microcontroller;
M. comparing said measured pressure differential to said target pressure differential;
N. if the measured pressure differential is different from the target pressure differential, calculating a revised second pressure value that provides said target pressure differential and sending a signal to said means for adjusting said second pressure indicative of said revised second pressure value; and O. adjusting said second pressure until it equals said revised second pressure value, thereby maintaining the target pressure differential.

19. The method of claim 18 wherein said means for adjusting said second pressure comprises a pressure regulator, a vent, and a vacuum pump.

20. The method of claim 18 wherein the step of measuring the pressure differential between said first pressure and said second pressure further comprises:
P. providing a differential pressure transducer that is in fluid communication with both said nominally closed system and said controlled pressure system and in operative communication with said microcontroller; and
Q. measuring the pressure differential between said first pressure and said second pressure using said differential pressure transducer.

21. The method of claim 18 wherein the step of measuring the pressure differential between said first pressure and said second pressure further comprises:
R. providing a first pressure sensor that is in fluid communication with said nominally closed system and in operative communication with said microcontroller;
S. providing a second pressure sensor that is in fluid communication with said pressure controlled system and in operative communication with said microcontroller;
Q. measuring said first pressure using said first pressure sensor and providing an output signal to said microcontroller indicative of the measured first pressure;
R. measuring said second pressure using said second pressure sensor and providing an output signal to said microcontroller indicative of the measured second pressure; and
S. calculating said measured pressure differential based upon the input signals of said first pressure sensor and said second pressure sensor.

22. The method of claim 18 wherein the rate of loss of said fluid is calculated continuously or at regular intervals of from about 0.1 second to about 1 hour.

23. In a method for determining a rate of fluid loss from a nominally closed system through and/or around a test article having a high pressure side and low pressure side of a type using a pressure decay method with mass point leak rate analysis, an improvement test comprising:
providing a controlled pressure system in fluid communication with the low pressure side of the test article;
establishing a desired pressure differential between the nominally closed system and the controlled pressure system;
maintaining the desired pressure differential as the fluid leaks from the nominally closed system through and/or around the test article;
recording a temperature and pressure of the nominally closed system as the fluid leaks from the nominally closed system through and/or around the test article and periodically calculating the leak rate and measurement uncertainty; and
terminating the test when either a predetermined measurement uncertainty level or test duration is reached.

24. An apparatus for determining a rate of fluid loss from a nominally closed system across a test article comprising:
a test article having a high pressure side and a low pressure side;
a microcontroller;
a nominally closed system containing a fluid that has a first pressure and is in fluid communication with the high pressure side of said test article, wherein said nominally closed system further comprises:
one or more pressure transducers in electrical or data communication with said microcontroller for measuring the pressure inside said nominally closed system and sending a signal to said microcontroller indicative of the pressure inside said nominally closed system; and
one or more temperature sensors in electrical and/or data communication with said microcontroller for measuring a temperature inside said nominally closed system, wherein said nominally closed system is in fluid communication with the high pressure side of said test article;
a pressure controlled system having a second pressure, wherein said pressure controlled system is in fluid communication with the low pressure side of said test article, and said second pressure is lower than said first pressure, thereby creating a predetermined pressure differential between said first pressure and said second pressure; and
a means for controlling said second pressure to maintain the predetermined pressure differential as the fluid is lost from said nominally closed system across said test article,
wherein said microcontroller calculates the rate of fluid loss across said test article based upon changes in said first pressure at said predetermined pressure differential and the temperature inside said nominally closed system.

* * * * *